United States Patent

[11] 3,608,480

[72] Inventor Tony Sciame
 Linden, N.J.
[21] Appl. No. 12,065
[22] Filed Feb. 17, 1970
[45] Patented Sept. 28, 1971
[73] Assignee Patent Development Corporation
 Linden, N.J.
 Continuation-in-part of application Ser. No. 689,224, Nov. 20, 1967, now abandoned,
 Continuation-in-part of application Ser. No. 553,397, May 27, 1966, now abandoned.

[54] HOT STAMPING AND HEAT TRANSFER PRESS FOR ROLLABLE OBJECTS
 4 Claims, 36 Drawing Figs.
[52] U.S. Cl. ............................................. 101/7,
 101/8, 101/11, 101/31, 101/40, 101/407 A, 308/6 R
[51] Int. Cl. ....................................... B44c 1/14,
 B41f 17/22
[50] Field of Search .......................... 198/183, 33
 R; 101/4–11, 407, 21, 25, 27, 31, 35, 38–40, 23;
 308/6

[56] References Cited
 UNITED STATES PATENTS

| | | | |
|---|---|---|---|
| 186,179 | 1/1877 | Taylor | 101/27 |
| 1,302,002 | 4/1919 | Boyer | 198/183 UX |
| 1,323,504 | 12/1919 | Turner | 101/31 UX |
| 2,346,174 | 4/1944 | Malnar | 101/7 X |
| 2,703,047 | 3/1955 | Scherer et al. | 101/8 |
| 3,195,450 | 7/1965 | Sciame | 101/9 |
| 3,375,045 | 3/1968 | Zeidler | 308/6 |

*Primary Examiner*—Robert E. Pulfrey
*Attorney*—Peter J. Gaylor

ABSTRACT: A press for hot stamping or heat-transferring an image upon a rollable object comprises a rigid bottom surface on which are rolled, in gripping relation, at least one pair of similar resilient spaced rollers carrying end-projecting shafts. The object is grippingly rolled between these rollers for imprinting the image thereon. A movable chain disposed on each side of the rolls has slotted bearings in which ride the projecting shaft ends, thus enabling the shaft ends to move vertically but not horizontally. A rigid unheated upper surface is disposed over the rollers in a manner to be capable of applying a vertical downward pressure on the rolled objects. A heated die is disposed within the upper surface, and a foil carrying thermoplastic ink or transfer is disposed between the object and the die for transferring the image onto the object as it is rolled under the die.

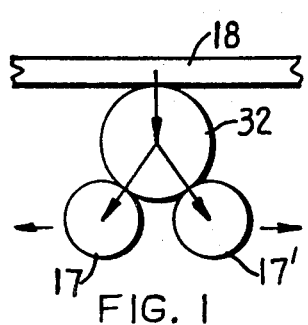
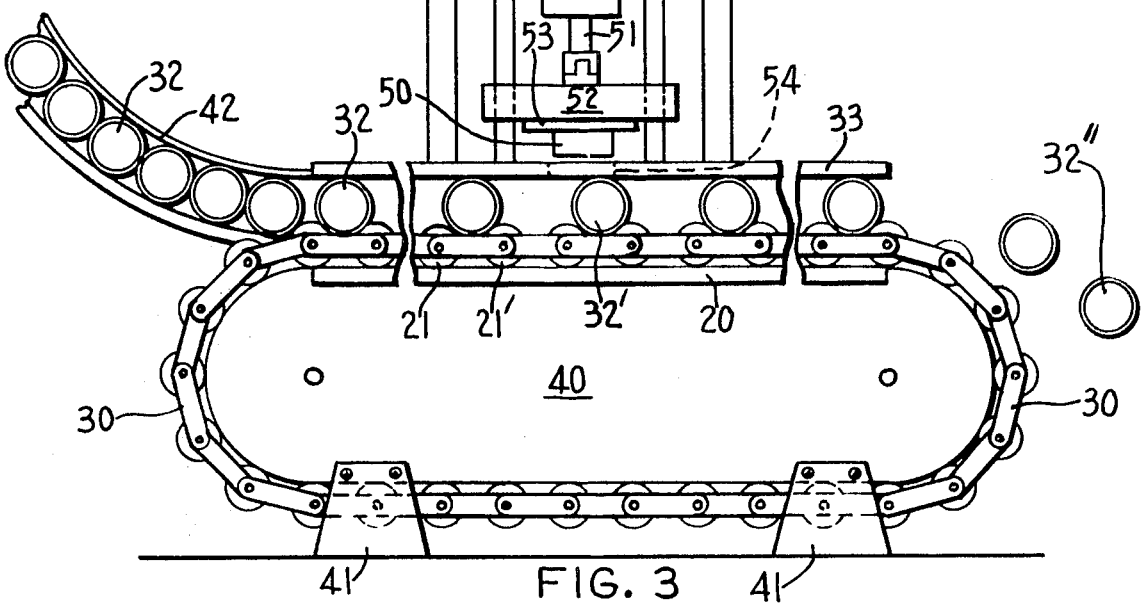
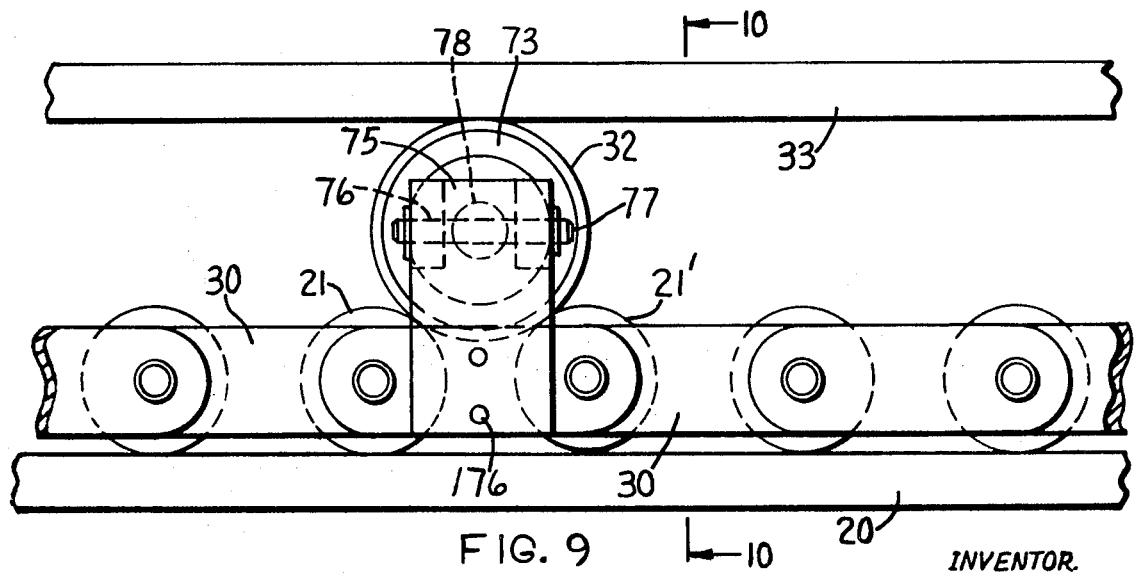

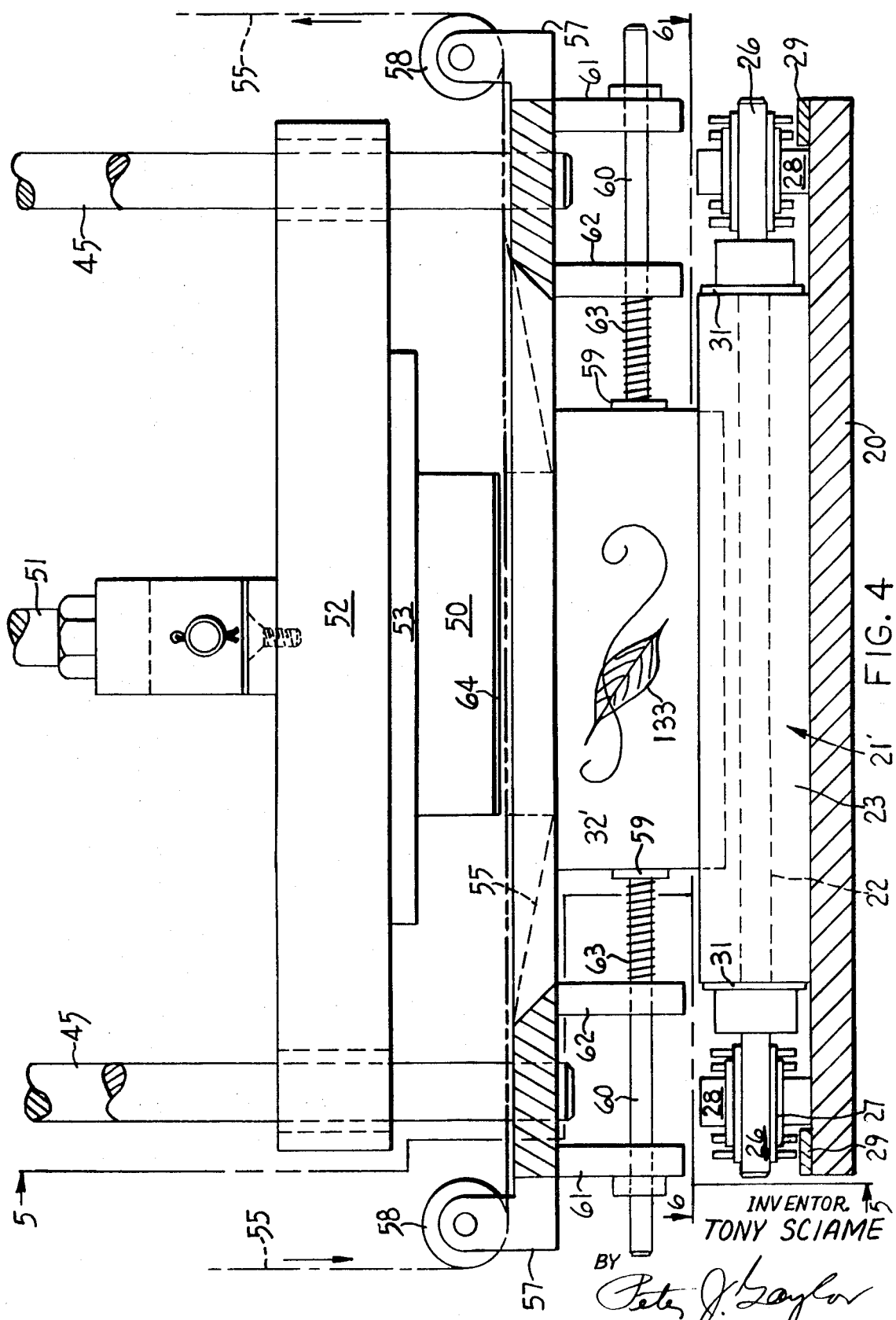

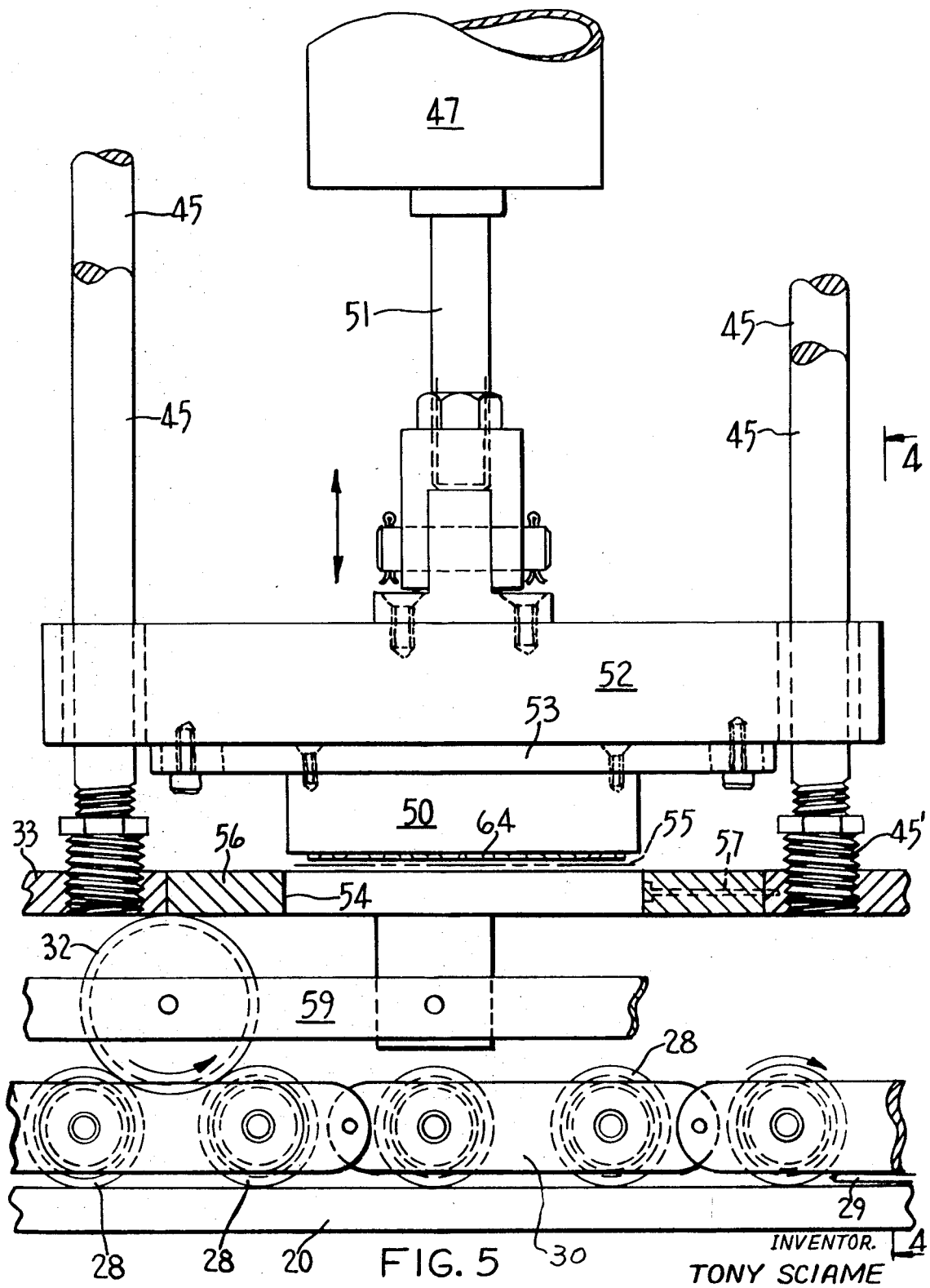

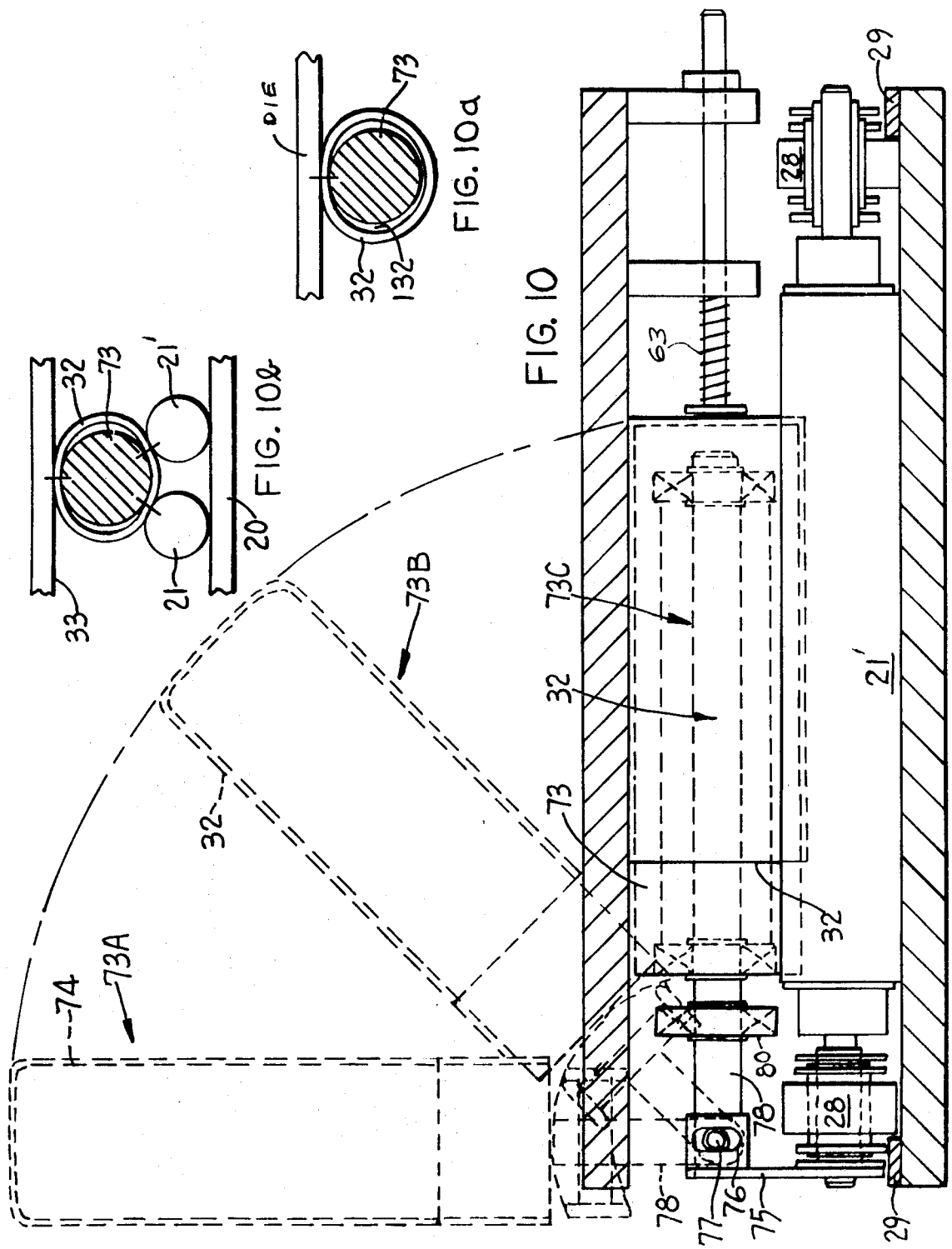

INVENTOR.
TONY SCIAME

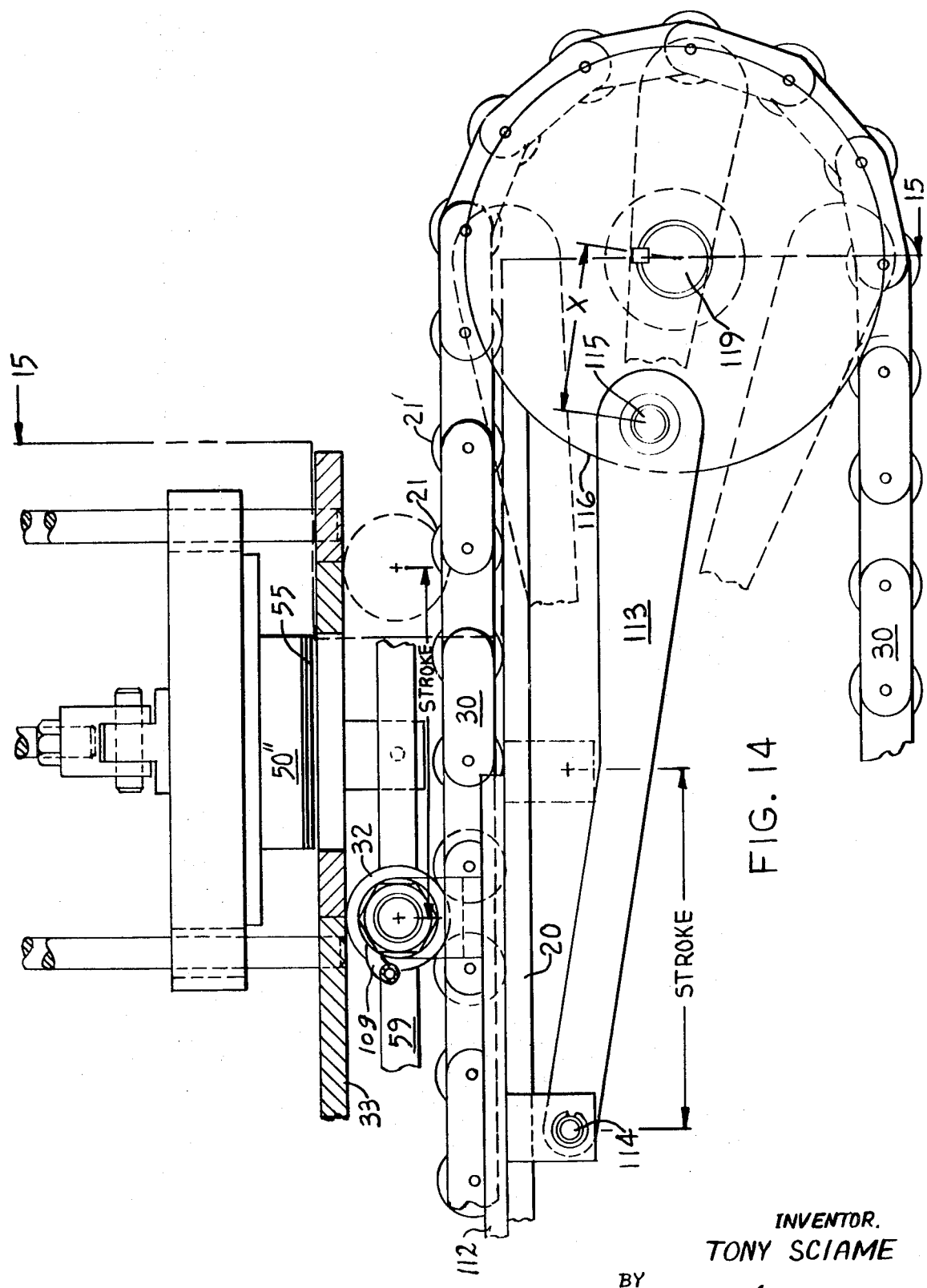

INVENTOR.
TONY SCIAME
BY
Peter J. Saylor
ATTORNEY

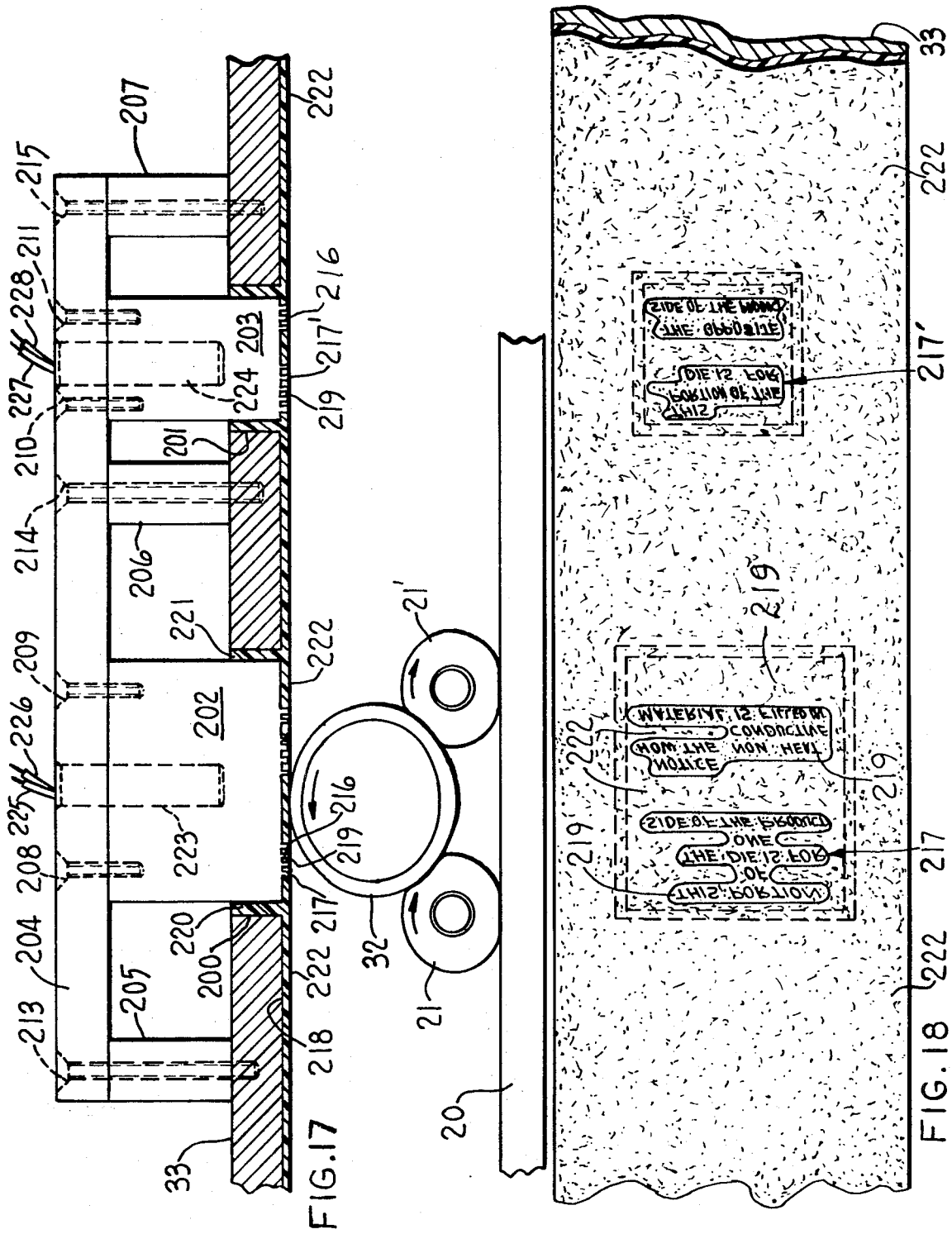

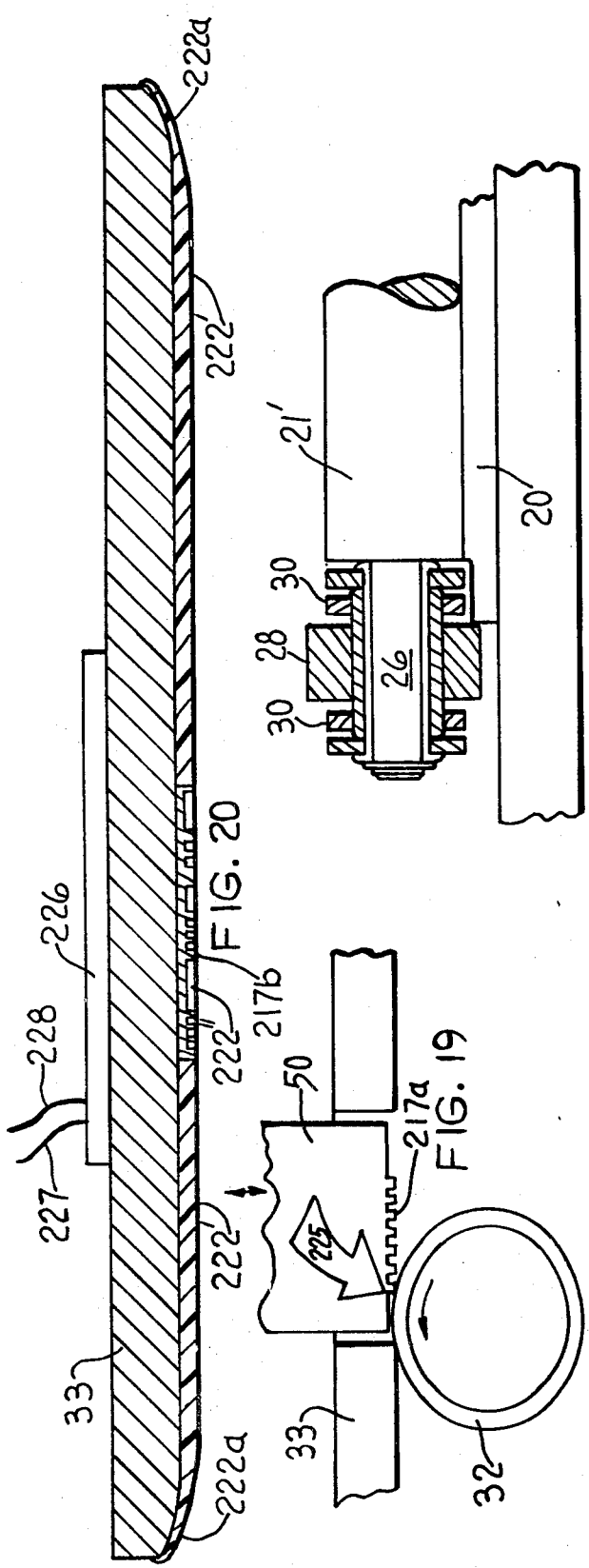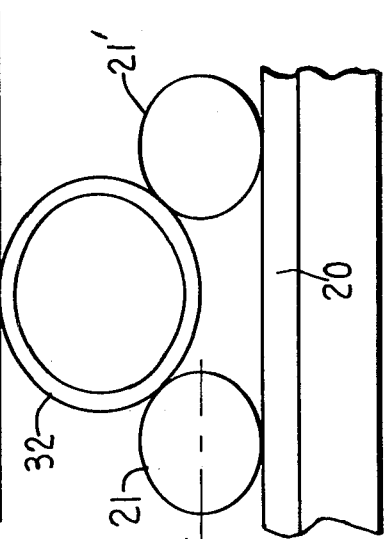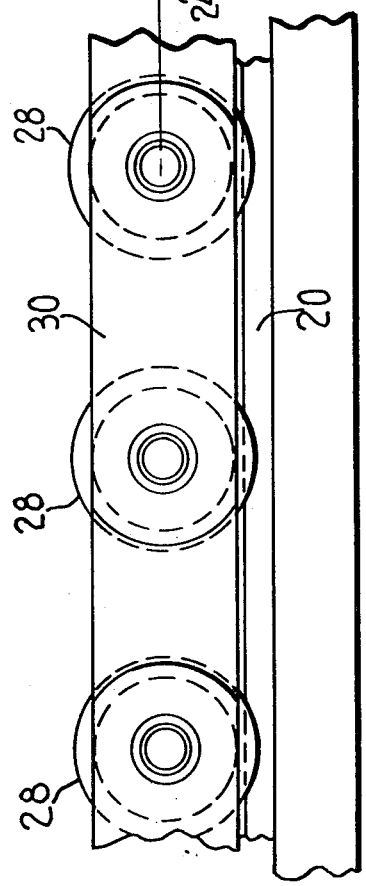

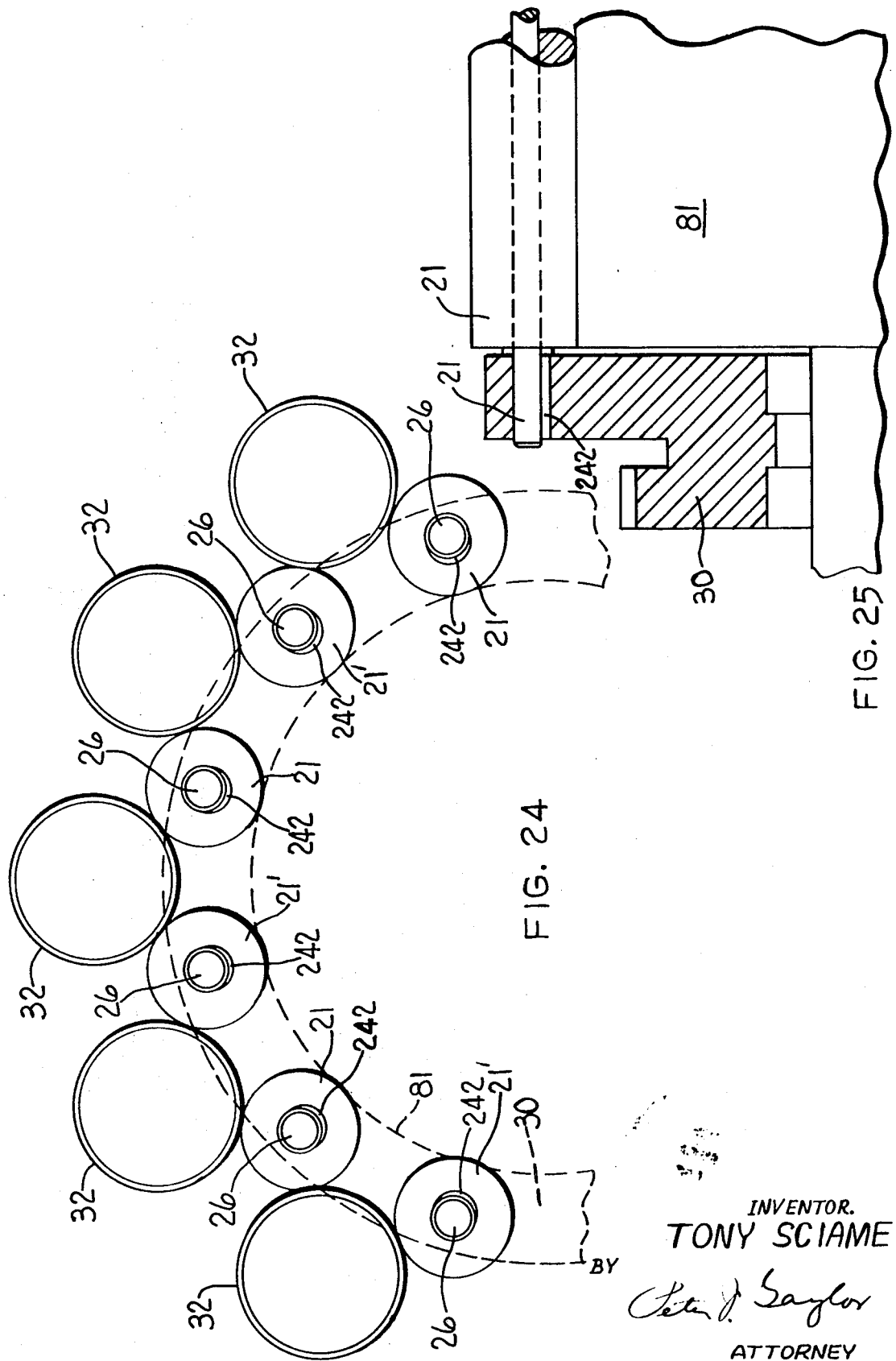

INVENTOR.
TONY SCIAME
BY
ATTORNEY

HOT STAMPING AND HEAT TRANSFER PRESS FOR ROLLABLE OBJECTS

CROSS-REFERENCES TO RELATED APPLICATIONS

This application is a continuation-in-part of copending application Ser. No. 689,224, filed on Nov. 20, 1967, by Tony Sciame, now abandoned which is a continuation-in-part of Ser. No. 553,397, filed on May 27, 1966, by Tony Sciame, now abandoned.

BACKGROUND OF THE INVENTION

This invention relates to a press machine and process for hot stamping of rollable objects and the heat transfer of labels, and similar material as well as to the process of doing same. More specifically, it deals with a machine wherein the rollable object to be stamped is disposed on resilient rollers, which roll grippingly on a rigid support surface, and said object being pressed in a vertical direction to said surface by a rigid upper pressing surface while the hot stamping or transfer is being effected on said object. This effects an "ironing-out" of the surface of the object to be stamped, thus preparing the pressure-evened surface adequately for the stamping operation.

Many containers, particularly those in the cosmetics field, are decorated with gold stamping, as well as with colored designs or lettering which is generally applied by silk screening. This means that the containers are usually first silk screened in the desired colors and then packed and shipped to the hot stamper, who generally applies the gold design and lettering. The reason why both (hot stamping and silk screening) operations are not effected simultaneously is that decidedly different arts and techniques are involved, requiring entirely different conditions and operations which are not considered to be compatible. For instance, silk screening involves only the application of an instantaneous light pressure of the pigment through the silk screen, whereas gold stamping requires a heavy pressure of a hot die upon the gold foil for a relatively much longer time. Suspended rollers are employed in the silk screen art, but such rollers, per se, are not capable of effecting hot transfer by the hot die technique in producing work of even average quality.

Silk screening employs a liquid ink which requires drying time. Hence, cylindrical and similar objects generally cannot have the entire periphery silk screened in a single operation.

One of the limitations of present hot-stamping operations is that, often, only a limited area of the work can be so imprinted, due to the fact that the work is held in cavity molds which do not permit access of the entire object for imprinting operation. As can be inferred from the nature of the manner of hot stamping now carried on, the rate of application is relatively slow, thereby involving high operational costs.

In the case of imprinting of very thin wall containers or containers of very soft material which cannot be imprinted by nonsupported means, mandrels have been inserted into the containers for support purposes.

A search of the prior art has revealed the Scherer U.S. Pat. No. 2,703,047, whereby filled gelatin capsules are rolled for branding by means of a stationary overhead die having a toothed marking surface. Before they reach the die, the capsules are passed between opposed bars having a bias of about 10° from the vertical, so as to have only a slight downward-forcing action on the capsule ends. Since such capsules are known to be thin-walled and flexible, it is obvious that only a light guiding effect is intended, as otherwise any appreciable pressure from such angle would distort the capsules and deform them into a spherical shape so that branding would be practically impossible, or else the pressure would burst the capsule. Since, for the purposes of the present invention, a vertically directed "ironing" pressure must be exerted over a substantial portion of the top of the object being stamped, the disclosure of the aforesaid patent has little bearing thereon.

A further reference disclosed in the art is the Malnar U.S. Pat. No. 2,346,174, which shows the extrusion of a moist soft coating over welding rods which are rolled on a flat conveyor belt under a die to impress a mark. Such a procedure would be inoperable if the rods were rolled between resilient rollers with pressure applied from above.

Another reference disclosed in the art is U.S. Pat. No. 2,635,533, wherein barrels are driven on a pair of rails by an overhead flexible conveyor and an imprinting unit intermittently rises between the rails and imprints the barrels. Since, this patent does not disclose the essential features of the present invention, i.e, the rigid upper "ironing" pressure surface, and the rollers grippable on a lower rigid surface, as well as the object imprinted, it too has little bearing on the present invention.

SUMMARY OF THE PRESENT INVENTION

According to the present invention, a machine is presented which enables a rapid hot stamping of the entire area of the object to be stamped at a high production rate. Furthermore, it permits the application, not only of gold, but of other multiple colors as well, in perfect register, and it enables the heat-transferring of labels and similar heat-transferable materials on rollable objects at a very high rate of speed. Broadly, the process involves the use of (1) a rigid bottom surface, (2) a series of resilient rollers on which the object to be imprinted (i.e., the work) is transported, and which rollers are designed to be disposed upon and to grip said bottom surface, (3) a rigid pressure surface designed to apply a vertical "ironing" pressure upon a portion of or the entire contactable surface of the object as it is being transported by and on said rollers, which object also grips said upper pressure surface, (4) a die or transfer serving to impress or apply the image (i.e., the imprint) on the work while the latter is rotating under the "ironing" pressure of the upper surface, and (5) vertically slotted bearings in which the roller shafts rotate. Other features will become apparent as the description proceeds.

Refer to FIGS. 1 and 2 will illustrate the difference in the forces involved when comparing the present invention with prior art techniques, such as those involved in silk screening. A typical silk screening process, such as that depicted schematically in FIG. 1, involves the passage of a screen 18 over the work (such as container 32) which is disposed over rollers 17 and 17'. Or, alternatively the work 32 is rolled under screen 18 by rollers 17—17'. For this operation, a very light vertical pressure must be exerted between the work 32 and screen 18. However, on the other hand, if a hot-stamping operation were to be effected in this manner, the vertical pressure required would cause rollers 17 and 17' to be forced in the directions of the outside arrows, so that a very poor quality of work would result, if at all. In the present invention, as outlined in a general way in FIG. 2, rolls 21 and 21' are disposed, in gripping relation, with a bottom plate 20. An upper pressure plate 33 (or die) impresses a vertical "ironing" pressure on at least a substantial portion of the contactable surface of container 32, which is in gripping relation with plate 33. This vertical "ironing" pressure is transmitted to rolls 21–21' in a manner such that, as the pressure is increased, the gripping action of rolls 21–21' is increased on bottom plate 20, so that there is no possibility for rolls 21–21' to deflect laterally, and thus an imprint of high quality is applied to container 32.

Another feature of the present invention resides in the insertion into the upper pressure plate of a stationary heatable die, the kerns of which project beyond the plate surface. The spaces between the kerns of the die are filled with a heat-resistant heat-insulating material, and the lower surface of the plate surface subject to foil-melting temperature is also coated with a heat-resistant, heat-insulating material, so that the face of the die is the only exposed element at foil-melting temperature (which is usually about 150° to 300° F.) when the object is rolled under the plate surface for image transfer.

BRIEF DESCRIPTION OF THE DRAWINGS

This invention will be more readily understood by reference to the accompanying drawings in which a preferred embodiment is described, and in which the same numerals refer to similar parts in the various figures. In the drawings:

FIG. 1 depicts a schematic representation of the forces involved in conventional screen printing.

FIG. 2 shows a similar schematic representation of the forces involved in the process of the present invention.

FIG. 3 shows a side elevational view of hot-stamping press of the present invention designed to hot stamp a on cylindrical plastic containers fed onto the continuous roller chain of the machine.

FIG. 4 illustrates a cross-sectional front end view of the portion of the same machine taken along the plane of line 4—4 of FIG. 5.

FIG. 5 depicts a side elevational view of the machine taken along the planes of line 5—5 in FIG. 4.

FIG. 9 presents a detailed side elevational view of the mandrel support bracket shown generally in FIG. 8.

FIG. 10 illustrates a cross-sectional front end view of a mandrel, with tubular work mounted thereon, taken along the plane of line 10—10 in FIG. 9.

FIG. 10a depicts a schematic side elevational view of hot stamping with use of a mandrel by conventional present-day methods.

FIG. 10b shows a similar schematic side elevational view of hot stamping with use of a mandrel according to the present invention.

FIG. 14 presents a side elevational view, in enlarged form of the discharge portion of the unit depicted in FIG. 13 showing details of a driving means for reciprocating the air injection cylinders in coordination with the moving chain and the product.

FIG. 17 depicts an elevational front view, partly in cross section, of the center portion of the upper pressure plate carrying stationary dies wherein the spaces between the kerns are filled with a heat-resistant, heat-insulating material, and the heated bottom portion of the plate is coated with a similar material. The work being rolled thereunder on rollers disposed over the bottom plate is also shown schematically.

FIG. 18 illustrates a bottom view of the upper pressure plate shown in FIG. 17.

FIG. 19 presents a schematic front view of a similar arrangement as might be envisioned with a conventional die.

FIG. 20 shows a front elevational view, partly in cross section of an upper pressure plate having the shoulders of the dies cemented directly onto the bottom of the upper pressure plate, and wherein the spaces between the kerns of the dies are filled with a heat-insulating material, and the heated bottom surface of the upper pressure plate is likewise coated.

FIG. 21 shows a side elevational view of an end portion of a roller as it is rolled directly on the lower pressure plate.

FIG. 22 depicts a front elevational view thereof.

FIG. 23 illustrates a schematic front elevational view of the same arrangement as used with the upper pressure plate pressing upon the work to be stamped.

FIG. 24 shows a schematic front elevational view of the upper portion of a rotary unit such as that in FIG. 18, wherein the roller shafts are enclosed in bearing slots so that the shafts are vertically movable in the bearings.

FIG. 25 presents a schematic side elevational view, partly in cross section, of an end of one of the rollers shown in FIG. 24.

The same numerals refer to similar parts in the various figures.

DESCRIPTION OF THE PREFERRED EMBODIMENTS

Figure 6:
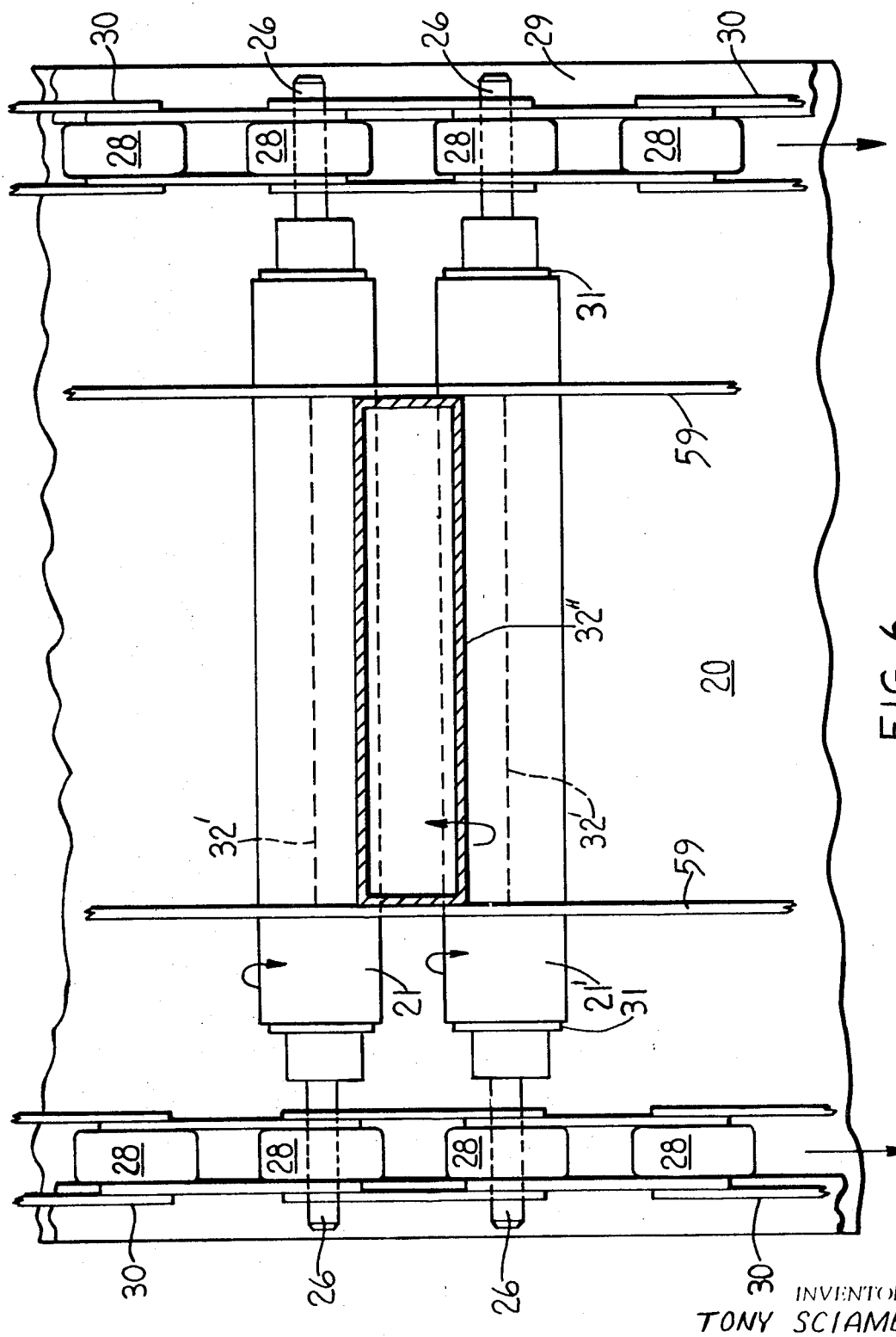
FIG. 6 presents a cross-sectional top view taken along the plane of line 6—6 in FIG. 4.

Referring to the drawings, and particularly to FIG. 3, numeral 40 represents generally a base mounted on legs or stands 41. An endless wheel chain 30 is driven vertically around base 40 by a motor (not shown). The work (or objects), consisting, in this case, of cylindrical plastic containers 32, is fed through chute 42 onto chain 30 and between chain rollers 21 and 21'. As the chain moves the work, the rollers 21 rotate the containers 32 which are pressed onto rolls 21 by pressure plate 33. Rollers 21–21' are also pressed, by this pressure, against bottom plate 20. The pressure exerted by plate 33 may vary from a heavy to a very heavy pressure adequate enough to enable the rollers to grip the work and bottom plate 20, as well to "iron" out the contactable surface of the work object for stamping. It is generally necessary to exert a heavy pressure so as to deform the container 32 in order to obtain the very uniform necessary condition for successful die stamping.

The rollers 21 are resilient and are designed to grip bottom plate 20 and containers 32.

Figure 7:
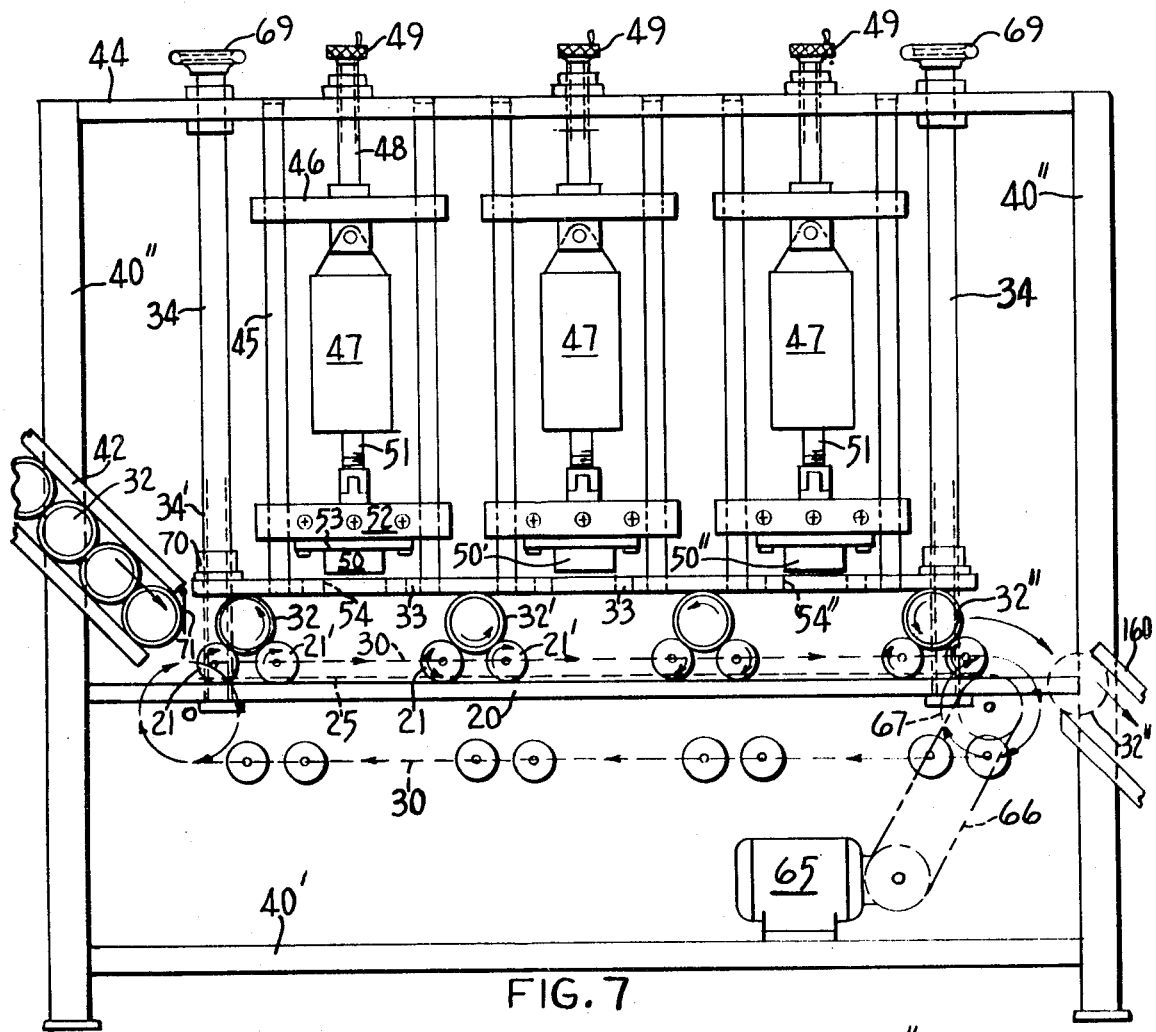
FIG. 7 shows a side view of the main section of a machine similar to that shown in FIGS. 3–6, adapted for hot stamping in three colors.

Base extensions 40" (FIG. 7) which are attached to base 40', are provided with upper cross plate 44, to which are attached four vertical guide rods 45 for each die-stamping station. Plate 46 which rides over guide rods 45, has mounted on its bottom, hydraulic or pneumatic motor 47. Plate 46 (FIG. 3) is attached at its top to rod 48 having a vertical adjustment 49 for moving thereon air motor 47 to adjust for the height of die 50 mounted on the bottom of motor ram 51. In FIG. 7, stands 41 of FIG. 3 are replaced by frame 40'—40".

A heater plate 52, containing heating cartridges (not shown), which rides over guide rods 45, is attached to the bottom of ram 51. Attached to the lower portion of heater 52 is die mounting plate 53. The heat from plate 52 is transferred to die 50 for softening the gold foil 55 (FIG. 4) used for transferring the die image onto the container 32. Die 50 is designed to be forced momentarily through an opening, the periphery of which is denoted by numeral 54 in plate 33 (FIG. 3), where it strikes the gold foil 55, for example, as it proceeds to contact container 32'. As container 32' rolls while under the "ironing" vertical pressure of upper surface 33 and under the foil and die, a gold imprint of good quality is impressed on the outer periphery of container 32' (FIG. 7). While being imprinted, the containers are moved by chain 30, and thereafter, they are discharged therefrom as finished containers 32".

Referring further to the drawings, numeral 20 represents a flat metal bottom plate, which may be vertically adjustable, and serving as the base extending over the working area. On this plate roll rollers 21 and 21', which, desirably, comprise a heavy metal core 22 covered on the outside with a thick cover 23 (FIG. 4) of a resilient material, such as sponge rubber, soft plastic, or the like. The material 23 is selected so that it also exerts a gripping action upon plate 20 when pressure is exerted on the rollers. Projecting shaft ends 26 of rollers 21 and 21' are mounted in bearings 27, on which ride wheels 28 of roller chain 30. A guide plate 29 is provided on plate 20 on each outer side of wheels 28 to reduce side play of the roller chain. Due to the friction between rollers 21-21' and lower plate 20, the latter rollers roll on said plate as roller chain 30 pulls shafts 26.

Thrust washers 31 take up the sideway of rollers 21. Roller chain 30 is desirably of the hollow pin type which permits the roller shaft 26 to extend through the center of wheels 28 and the pitch line of the driving force. The chain is driven by a motor (not shown). Rollers 21 can be located at will, as demanded by size of the work.

The work objects or product 32 or 32' to be stamped with the image or design 133, is fed onto chain 30 between rollers 21 and 21', and under pressure plate 33, which impresses a heavy vertical "ironing" pressure upon the container product 32 as it is rolled around by rolls 21 and 21'. Pressure plate 33 is held in place by supports 34 (FIG. 3) which are attached at their tops to the frame plate 44 and at their bottoms to base 40. The height of plate 33 is made adjustable by screws 45' (FIG. 5).

Pressure plate 33 has an opening 54 large enough for die 50 to pass therethrough. Space plates 56 may be inserted in opening 54, and attached thereto by setscrews 157, for example, to fill any space not taken by the particular size die used, and thus avoid gaps in the necessary pressure plate "ironing" contact with container 32 as it rolls thereunder. Die 50, of course, is sized for the size of image or design 133 to be hot stamped onto container 32. A foil tape 55, of conventional type, carrying the thermoplastic color, to be applied by the die, is fed by a conventional indexing means, including roller supports 57, feeding rollers 58, and the like.

Container 32 is kept centered for proper registration of image 133 by means of guide bars 59 attached to the inner ends of sliding shafts 60. These shafts pass through support brackets 61 and 62, and springs 63 (FIG. 4) disposed between supports 62 and bars 59 impose a thrust upon container 32' on its way to be hot stamped. Springs 63 may be used on one side only of the containers. Also, the springs compensate for variation in the container size.

As already stated, electrical heater or heaters (not shown) are imbedded in heater plate 52, and are connected to a suitable electrical outlet. A heater may be imbedded in die 50, if desired. A motor (not shown) is mounted in base 40 to drive chain 30.

When in use, containers 32 are fed into chute 42, and they fall between rollers 21 and 21', as roller chain 30 passes under them. Due to the gripping action of the rollers on bottom surface 20, the container 32 is rotated thereby. The rollers are so spaced, and the speed of chain 30 is so adjusted, that when container 32' is in proper position under opening 54 for taking the stamping, ram 51 is forced down by motor 47, forcing hot die 50 over foil 55 to pass through opening 54 and to hot stamp the design 64 from the die while the container is rotating, leaving the imprinted image 133 thereof on container 32', after which the die is retracted back to its position, as in FIGS. 4-5. In this retracted position, the heat of die 50 and heater plate 52 will not heat up unnecessarily the tape, the container or parts touching the container.

As chain 30 continues, imprinted containers 32" are discharged from the conveyor chain, and the empty chain then proceeds to the feed end of the machine to pick up new containers to be hot stamped.

It will be noted that, during the hot-stamping operation, as die 50 impresses the necessary vertical "ironing" pressure upon the container 32', equal to the vertical pressure exerted by plate 33, and, in turn, this pressure is exerted upon rollers 21 and 21', the overall effect causes rollers 21 and 21' to grip bottom plate 20, which thus prevents spreading of the rollers and also prevents vertical deflection of the rollers, both of which effects would greatly affect the quality of the hot stamping. Furthermore, due to the resilient nature of roller portion 23, any uneven projections on container 32 or 32' are absorbed by the rollers without affecting the course or alignment of the containers.

FIG. 7 is shown a unit, similar to that depicted in FIGS. 3-6, but adapted to hot stamp three colors successively upon the container as it rolls on moving conveyor chain 30. Motor 65 mounted on base 40', drives belt 66 which, in turn drives gear 67 connected to chain 30. Containers fed through hopper 42 are picked up by roller pairs 21-21'.

As container 32 passes under die 50, a red-pigmented foil, for example may be fed thereunder to hot stamp the red portion of the image. Then, as the container passes under die 50', the gold foil, for example, is used to imprint the gold portion of the image. Finally, as the container rolls under die 50", the black portion, for example, of the image is imprinted, and the container completely hot-stamped in the three colors is dropped through outlet hopper 160, while chain 30 returns to inlet hopper 42 to pick up new containers.

In FIG. 7, rods 34 are mounted on embers 44, 33 and 20, in such a manner that, by turning screw handle 69, the threaded portion 34' on rod 34 will turn in nut portion 70 on plate 33 to effect vertical adjustment of plate 33. Backup plate 20 is attached to posts 40" of the base frame. A conventional escape mechanism or hinge arrangement 71 releases a container at a time onto rollers 21-21'. To obtain proper registration of successive stampings, spacing of roller pairs 21-21' may be varied. Also the roller chain pitch may be varied, or the roller diameter may be varied. Die position can be adjusted, and conveyor chain position may be adjusted by means of a conventional friction clutch arrangement (not shown) on the main shaft.

Figure 8:
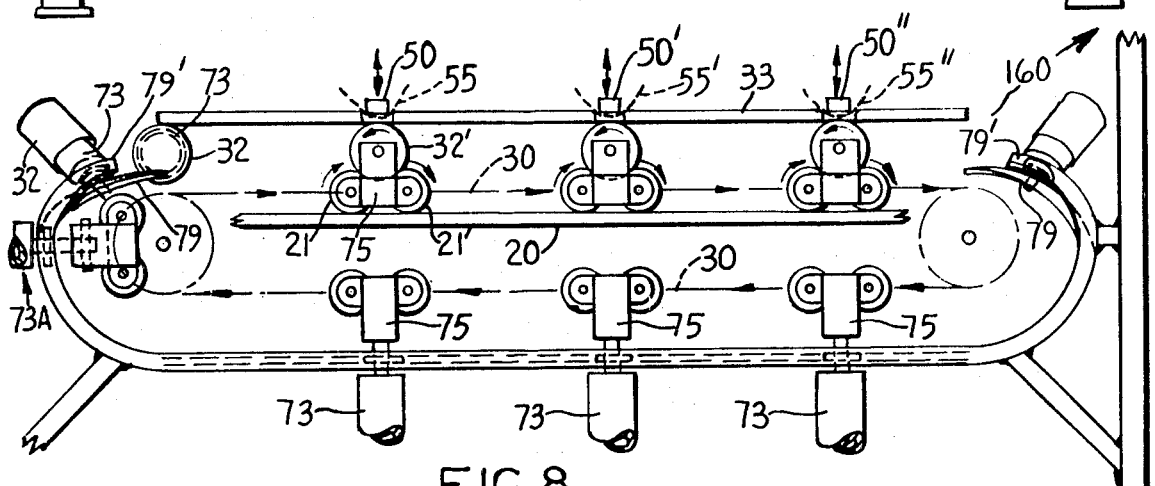
FIG. 8 depicts a schematic side elevational view of the main portion of a three-stage heat-transfer unit according to the present invention, adapted for feeding thin wall or soft wall cylindrical work disposed on mandrels.

In FIGS. 8-9, it will be noted that mandrels, rather than compressed air, (as will be taken up later) are used to support thin-walled containers for hot stamping or for heat-transfer purposes. The process is also useful for imprinting containers having walls too soft to be handled by the other means described herein. A free-rolling mandrel 73 is used. It is desirably constructed from metal tubing having a firm (but not hard) rubber or plastic coating 74 which is sized to fit snugly into the container 32. Mandrel support bracket 75 is attached to conveyor chain 30 at 176 and is centered between the support rollers 21-21'. Slot 76 (FIG. 10) in bracket 75 retains pin 77 in mandrel shaft 78 and allows the mandrel 73 to move in a vertical direction. This freedom of movements compensates for variations in container diameters and assures parallel contact with rollers 21-21' over the entire length of the container. By virtue of its contact with cam tracks 79-79' (FIG. 8), mandrel guide roller 80 (FIG. 10) directs the angular position of the mandrel 73 into the different positions. For example in position 73A, the mandrel is in raised position for loading (i.e., slipping onto it a container 32). In position 73B, the mandrel is in midposition after loading, while in position 73C the loaded mandrel has fallen into contact with support rollers 21–21' on its way for the marking or imprinting operation, successively, by die 50 and foil 55, then by die 50' and foil 55', and finally by die 50" and foil 55". Thereafter, cam tracks 79–79' again pickup rollers 80 and swing the mandrels 73 up into vertical position 73A, after which the containers are removed by hand, or by other suitable means, and then discharged into a hopper 160. As conveyor chain 30 advances, each pair of support rollers 21–21', appears and the associated mandrel 73 falls into position to support the container 32, slipped thereon, for the marking operation. Mandrels 73 are significantly different than those now employed in the art due to their coaction with the rollers and with pressure plate 33, as well as with backup plate 20, which provide positive frictional contact without deflection, spreading or slippage (See FIG. 1–2).

The advantages in using mandrels in the present invention will become apparent by reference to FIGS. 10a and 10b. In the present method, as exemplified by FIG. 10a, the die presses at one point upon the work 32, which leaves a space 132 around and between the rest of the work and the mandrel. This often results in slippage of the product on the mandrel, with consequent poor images deposited on the work. In the present invention, as outlined in FIG. 10b, the work is further supported by rollers 21 and 21', giving a three-point contact of the work with the mandrel surface, thereby providing adequate friction for simultaneous rolling of the work with the mandrel, so that imprints of high quality are possible.

Figure 11:
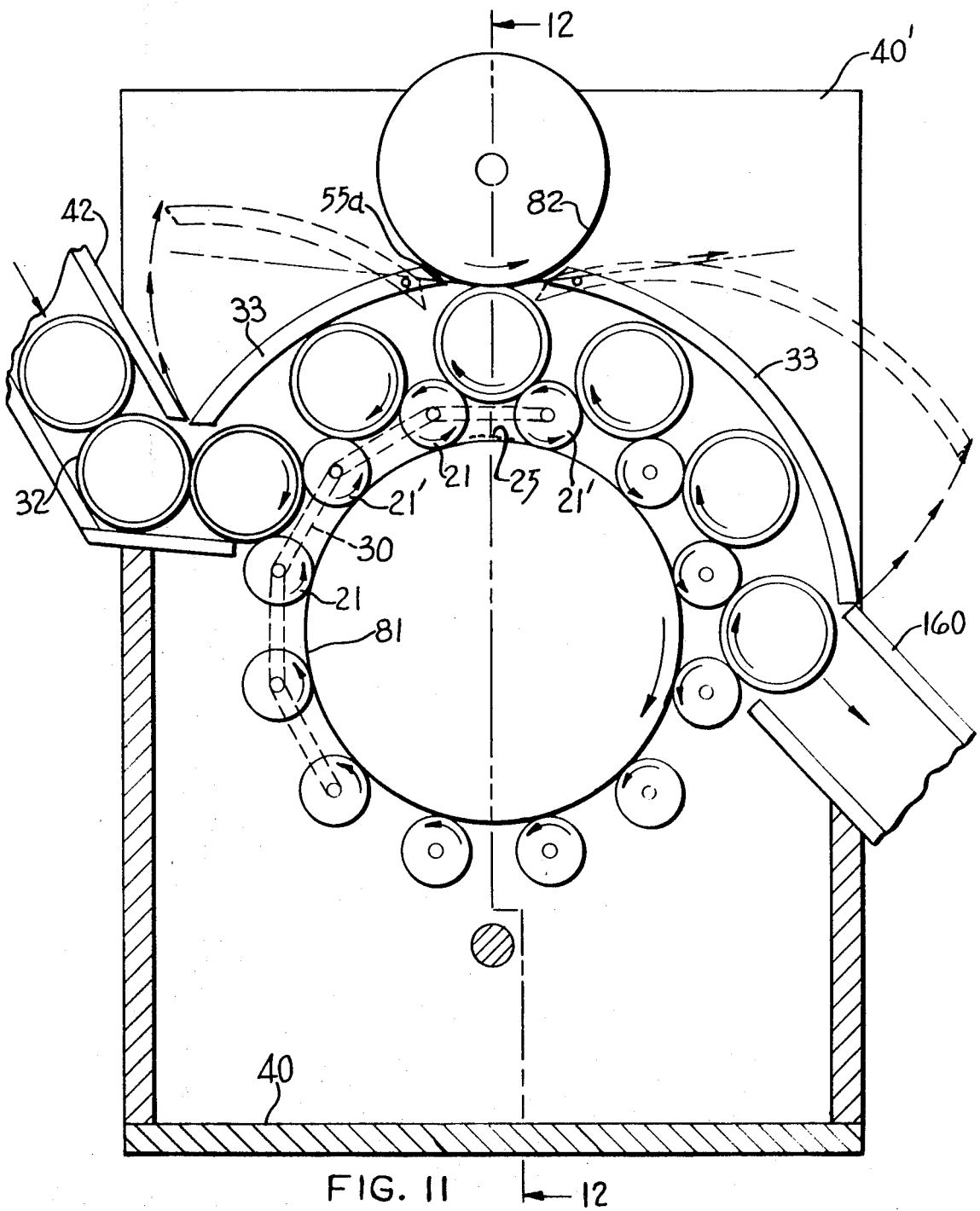
FIG. 11 shows a schematic side elevational view partially in cross section of a rotary unit of the present invention for either hot stamping or heat-transferring images with round dies on hollow plastic containers which may be filled with compressed air.
Figure 12:
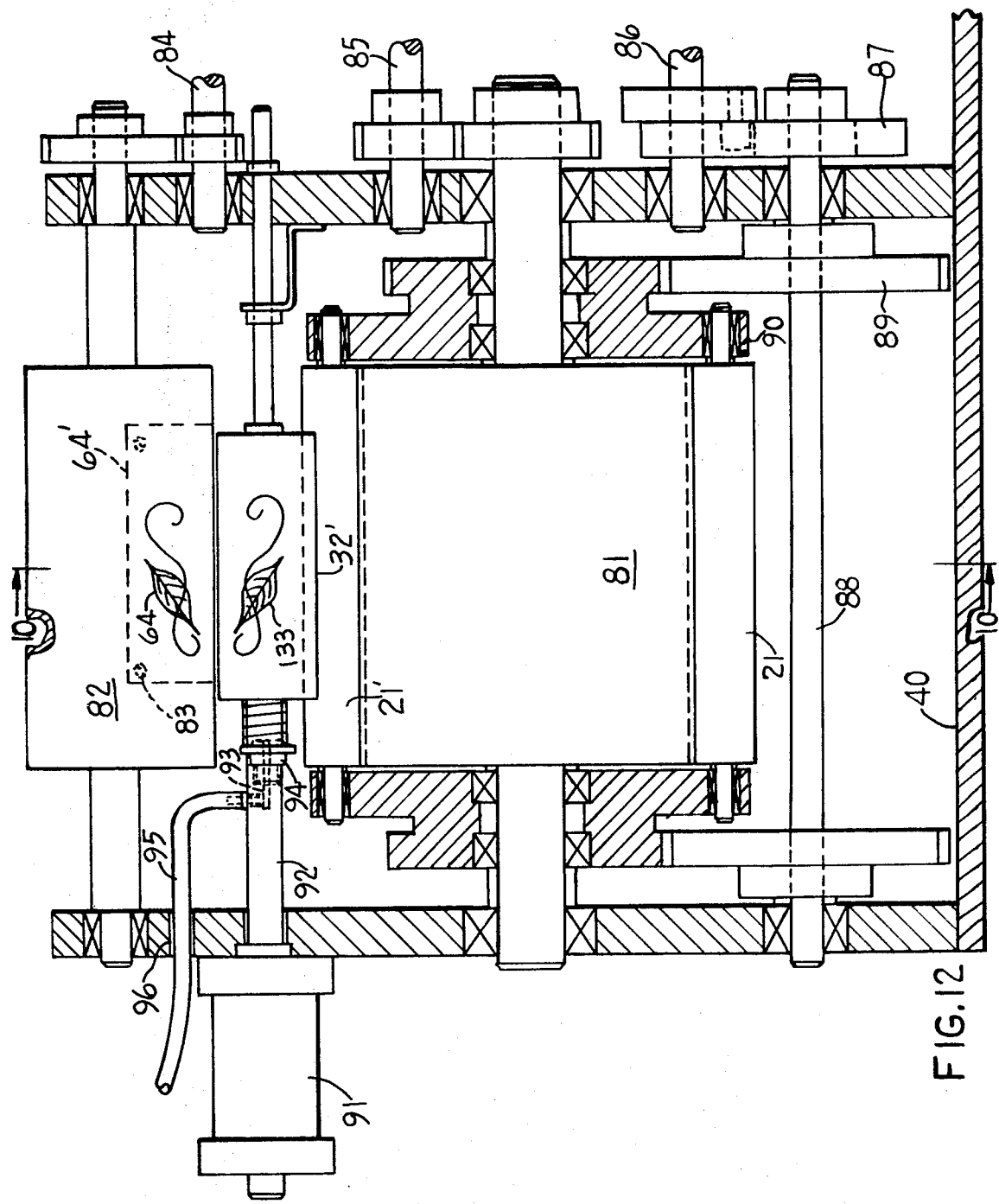
FIG. 12 illustrate a schematic front elevational presentation of the unit taken along the plane of line 12—12 in FIG. 11.
Figure 13:
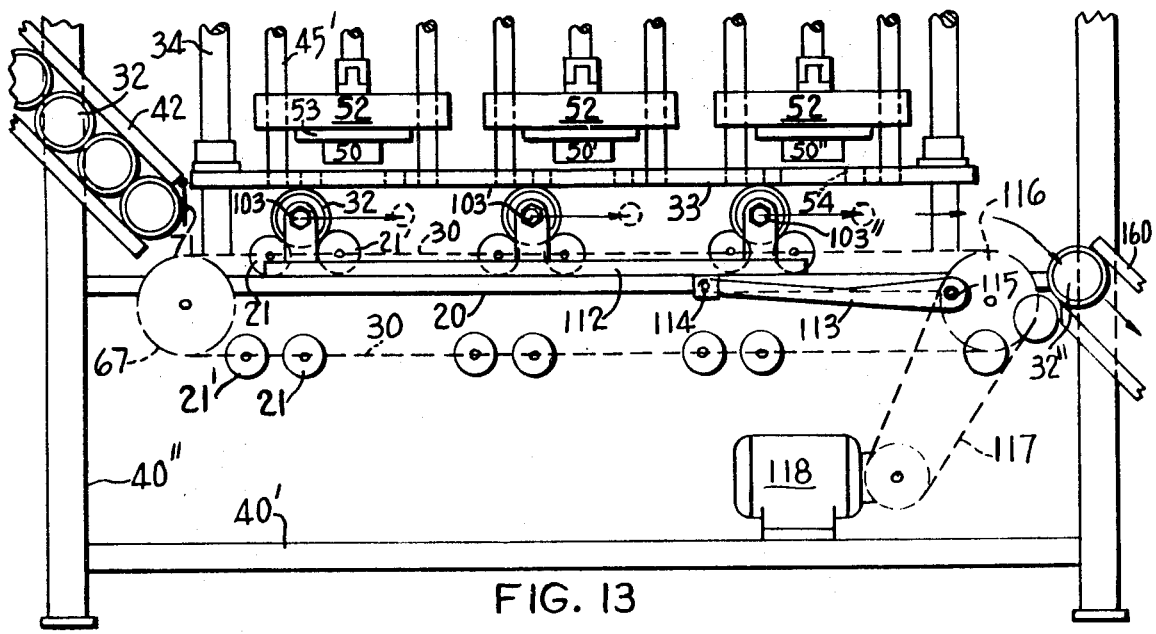
FIG. 13 depicts a side elevational view of a three-stage stamping unit, of the type shown in FIG. 7, as provided with air injection for subjecting the hollow work to be stamped to air pressure during the stamping operation.
Figure 16:
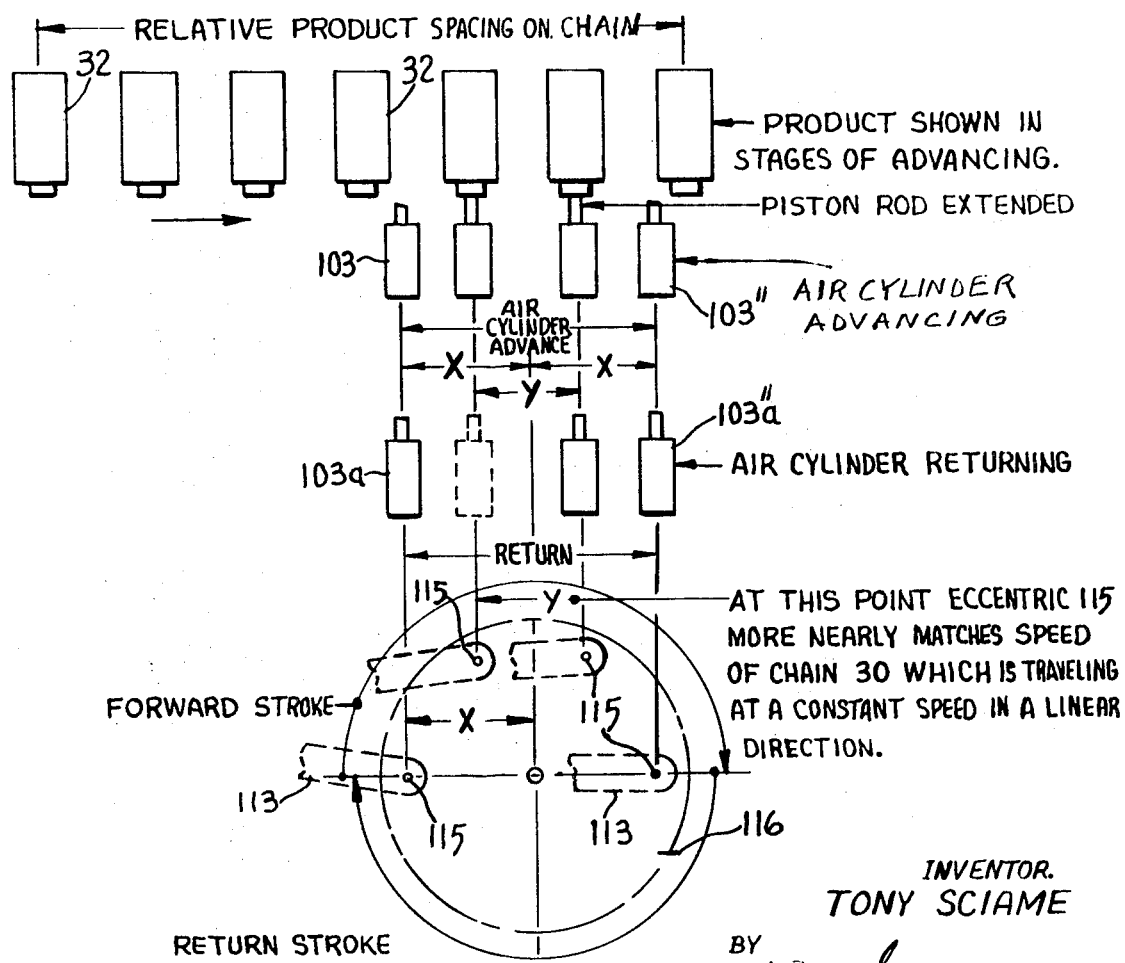
FIG. 16 is a schematic representation, in plan view, showing the action of the cylinder-advancing mechanism in relation to the air-injecting mechanism.
Figure 15:
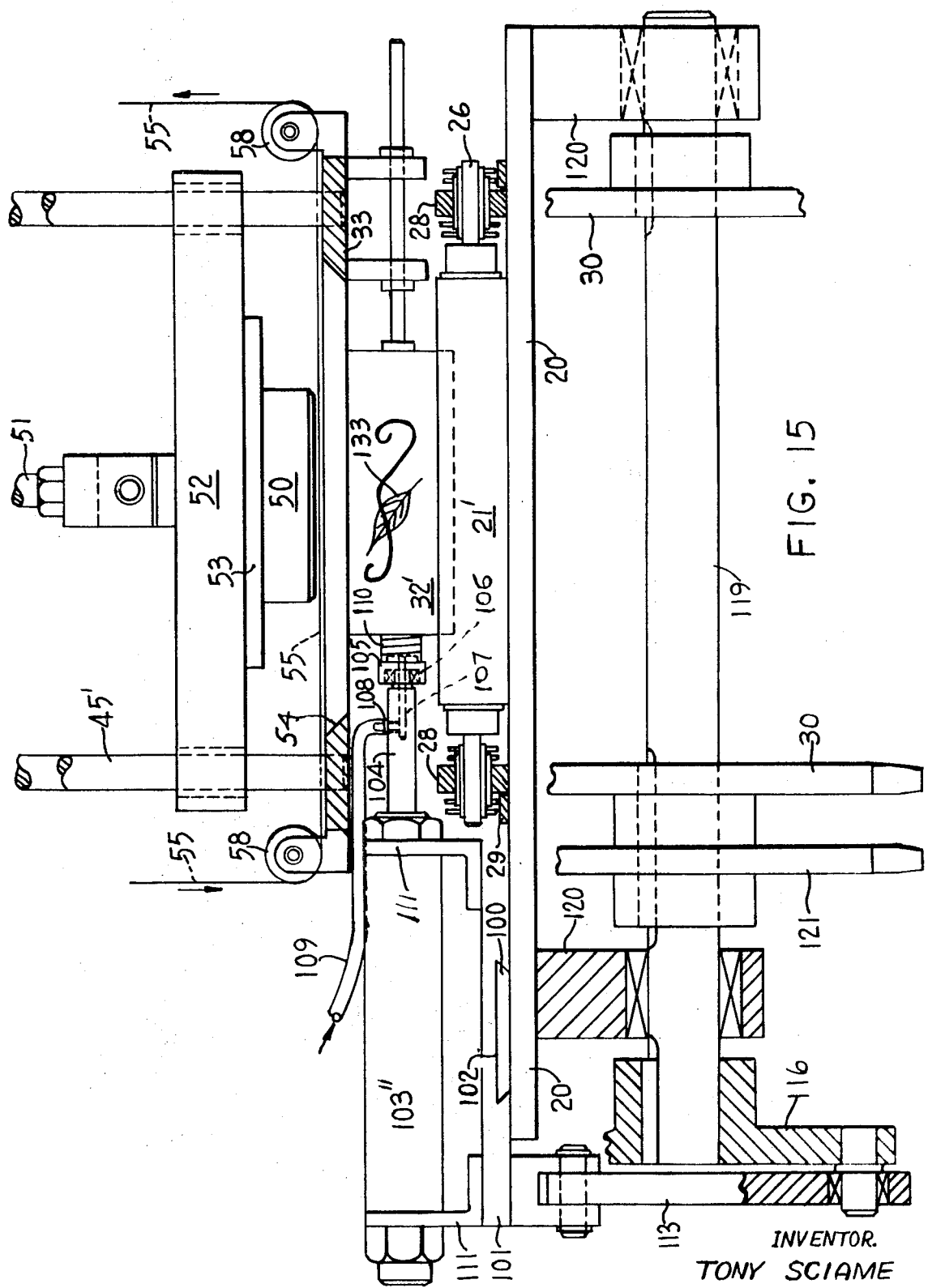
FIG. 15 illustrates a cross-sectional view taken along the plane of line 15—15 in FIG. 14, with the unit immediately after the stamping operation, with a portion of the driving link cut away.

FIGS. 11 and 12 are intended to illustrate a rotary application of the present invention for marking cylindrical plastic tubes by hot stamping or heat transfer methods (wherein a tape carrying a heat-transferable design is used instead of a die and heat-transferable foil). Wheel 90 (FIG. 12) drives product support rollers 21–21' around drum 81, the rollers being in frictional contact with the drum. Drum 81 thus is an embodiment of rigid bottom surface 20. Containers 32 are fed in through hopper 42 and, after falling between rollers 21–21', they are pressed vertically down by pressure plate 33'.

In the event a heat-transfer image operation is employed, a heat-transfer tape 55a is fed under heated roller 82, whereupon the image or label is transferred from the tape to the container 32', after which the imprinted containers are discharged through hopper 160.

In the event a hot-stamping operation is employed, heated roller 82 has die surface bearing the etched design 64 (in cameo or intaglio, as desired), which is transferred onto the container 32', as image 133.

In FIGS. 11–12, three separate variable speed drives (84—85—86) control the surface speed of the backup drum 81, the indexing of the product support rollers 21–21', and the heated pressure drum 82. These variable surface speeds are considered necessary to adjust for the two processes involved, and for the different sizes of products to be handled. Backup drum 81 rotates constantly and, product support rollers 21–21', being in close contact with it, are also caused to rotate constantly. The rollers are indexed one position at a time, which permits the product to fall from input hopper 42 and advance by increments to a position directly under heated pressure drum 82, where the marking operation is performed. It is to be understood that the containers 32 (i.e., the product) are continuously revolving by virtue of their frictional contact with support rollers 21–21' and pressure plate 33', as well as drum 82.

Hot-stamping foil or heat transfer tape 55a is advanced by conventional means, at a speed equal to the surface speed of drum 82. Depending on the product diameter and area to be marked, foil or tape 55a and drum 82 may be indexed, rather than constantly revolved, to conserve material.

Use of drum 82, as opposed to a flat surface, lends itself to higher production rates, as foil or tape 55a advances with drum 82, thereby reducing wasted motion to a minimum.

Heated drum 82 may be coated with a firm silicone rubber for use with heat transfer tape. For hot stamping, a curved metal die 64' would be desirably fastened at 83 to the drum 82. In both cases, the drum 82 would be heated to the desired image or foil-softening temperature by conventional means (not shown).

A drive means 86 is provided for indexing support rollers 21–21' around drum 81. Motion is transmitted through shaft 88 and thence through gear 87 and gears 89, at both ends of the shaft, to wheel 90 which retains support rollers 21–21' as they rotate with drum 81. Wheel 90 indexes as rollers 21–21' rotate. Two wheels 90 are located at each end of drum 81 for alignment of rollers 21–21' and for support purposes.

The drive means 84 for heated drum 82 may be of the constant revolution, partial index, or single-revolution type. Drive means 85, for backup drum 81, which, in turn, drives rollers 21–21', is in constant rotation at variable speeds. Drive means 86, has its motion transmitted through shaft 88.

An air or hydraulic cylinder motor 91 may be mounted on frame 40 for supplying power to move ram 92 into contact with the hollow container 32', so as to inflate it with compressed air, if this is needed to support the container wall for the imprinting operation. Ram 92 is extended laterally for each index of roller wheel 90, and is provided with an air passage 93 and an appropriate nozzle 94 to fit the opening of container 32'. An air tube 95, sliding in opening 96, supplies compressed air to support the container wall for the imprint at intervals to coincide with the indexing of the container. Hinged pressure plates 33 may be transparent to permit safe observation of the operation.

In FIGS. 13–16, means are shown for inflating thin-walled containers which require support during the marking operations, and particularly in cases where use of mandrels is impractical, such as in necked containers. A three-stage marking unit, such as that shown in FIG. 7, is employed for the stamping operations.

Dovetail slide guide 100, (FIG. 15) attached to plate 20, near the side thereof has mounted thereon, in sliding relation, cylinder plate 101, having a cutout portion 102 into which fits guide 100. Air motor cylinder 103 is attached onto plate 101 by brackets 111. The motor has piston rod or ram 104 terminating with coupler 105 attached to the end of ram 104 by a swivel ball bearing coupling 106. The end portion of ram 104 and coupler 105 are provided with a hollow channel 107 which leads to nipple 108 connected to air hose 109 (FIG. 14). Motor 103 may be actuated to force ram 104 and coupler 105 into an outside-sealing connection with neck 110 of hollow product or container 32'. The three motor cylinders 103, 103' and 103" are connected to cylinder plate 101 which is reciprocated by link 113 at a speed designed to match the speed of roller chain drive 30 on which the containers 32–32' ride. Link 113 is connected at one end to cylinder plate 101 at swivel 114. At its other end, link 113 is swivally connected at eccentric pin 115 to wheel 116 which is driven, via chain drive 117, by motor 118. Shaft 119, mounted on supports 120, carries wheel 116, and chain sprocket drive wheel 121, and chain sprockets.

Inflation of containers 32–32' is effected by means of conventional air motor 103 which is actuated by electrical switches (not shown), so that ram 104 is extended toward container neck 110 which fits, in outside-sealing relation with the nozzle of coupler 105 as the container 32 is advancing and just prior to the marking operation wherein die 50 is forced through opening 54 onto foil 55 and onto the container surface to imprint image 133 thereon.

Thereafter, ram 104 is retracted after which link 113 returns plate 112 and the cylinders 103–103" to the first position ready to connect with the next container brought on by rollers 21–21'. Cylinders 103–103" are spaced in accordance with the spacing of the containers carried on rollers 21–21'.

Eccentric pin 115, mounted on driven wheel 116, revolves on the same shaft 119 as the wheels carrying chain sprockets 30. Through link 113, linear motion is transmitted to plate 112 carrying air motors or cylinders 103–103". The center distance X (FIG. 16) is such that, during a portion of its revolution Y, its linear speed closely matches that of the containers 32-32'. The positions of the returning air cylinders are marked 103a–103"a.

Plates 20 and 33 may be coated with a plastic or other type of coating to enhance grippability.

One important feature of the present invention is the use of stationary heated dies which form a part of the upper pressure plate 33. This is made possible by the use of heat-resistant insulation covering all of the heated exposed surfaces, except the face of the die or type. As shown in FIGS. 17–18, upper pressure plate 33 is provided with openings 200, 201, etc. into which may be inserted dies (or type bodies) 202, 203, etc. These dies may be mounted onto a mounting plate 204, for example, (having support legs 205, 206, 207, etc.), by means of screws 208, 209, 210, 211, etc.) and the assembly then may be mounted, by screws 212, 213, 214, 215, etc. onto the upper portion of upper pressure plate 33, in a manner such that only the kerns or necks (beards) 216 of die faces 217–217' protrude beyond the lower surface 218 of pressure plate 33. This protrusion generally amounts to a little less than 0.1". Thereafter, all of the spaces 219 between the kerns of the die faces 217–217', as well as the lower surface of plate 33 which may be heated to the melting point of foil 55 are filled or coated with a heat-resistant, heat-insulating plastic or resin, such as heat-resistant phenol-formaldehyde resin, heat-resistant polyurethane plastic, heat-resistant rubber, fluoropolymers, or the like. Such compositions are conventional and are available on the market. It is preferably to employ a paste which is applied by spatula and then spread out by a glass plate under pressure until only all of the die faces are visible as uncovered through the glass. The coating then is dried to remove volatile materials, and thereafter is ready for use. Spaces, such as spaces 220, 221, etc. are desirably filled with the heat-resistant plastic layer 222 (shown as stippling in FIGS. 17–18). It is then apparent that when electric cartridge heaters 223 and 224 are heated by current through leads 225–226 and 227–228, respectively, only the die faces 217–217' will be hot enough to melt the foil 55 as container or cylinder 32 is rolled by rollers 21–21' on bottom plate 20. Die face 217 thus would hot stamp the front of cylinder 32, while die face 217' would hot stamp the opposite side of the cylinder. The foil is not shown in FIGS. 17–18, but it is obvious that it would be fed between the cylinder 32 and the die faces.

The heat-insulating plastic coating 222 also serves an additional important function, as is apparent from FIG. 19. If the work 32 were rolled against die face 217a in the conventional manner, using reciprocating die 50, it will be noticed that the abrupt impact of the work surface 32 upon the initial kern projections of die 217a (the projection area being indicated by arrow 225), the impact tends to result in a heavy imprinting at the leading edges of the kerns, while a smudging tends to take place at the trailing edges of the kerns. This is well recognized as taking place with present die-stamping techniques using conventional stationary dies.

In FIG. 20, the alternative construction shown comprises a metal die 217b attached by screws or cemented to the bottom of upper pressure plate 33 with a heat-conductive, heat-resistant cement, such as silicone cement. A heat-resistant, heat-insulating resin 222' is then applied between the kerns (as 222") and at the bottom surface of plate 33. The ends 222a of the plastic-coated surface may be tapered to eliminate any impact shock to the work rotated thereunder. A flat-plate-heating element 226, having electrical leads 227–228, may be employed for heating the die. The aforesaid structure eliminates considerable machining.

As is shown in FIGS. 21–23, which disclose the preferred system for rotating rubber rollers 21–21', rubber rollers 21–21' ride directly on bottom pressure plate 20, while roller chain 30 and its wheels 28 ride in vertically floating relation, as can be seen from the displacement 241 of the two roller centers.

Figures 25A, 26:
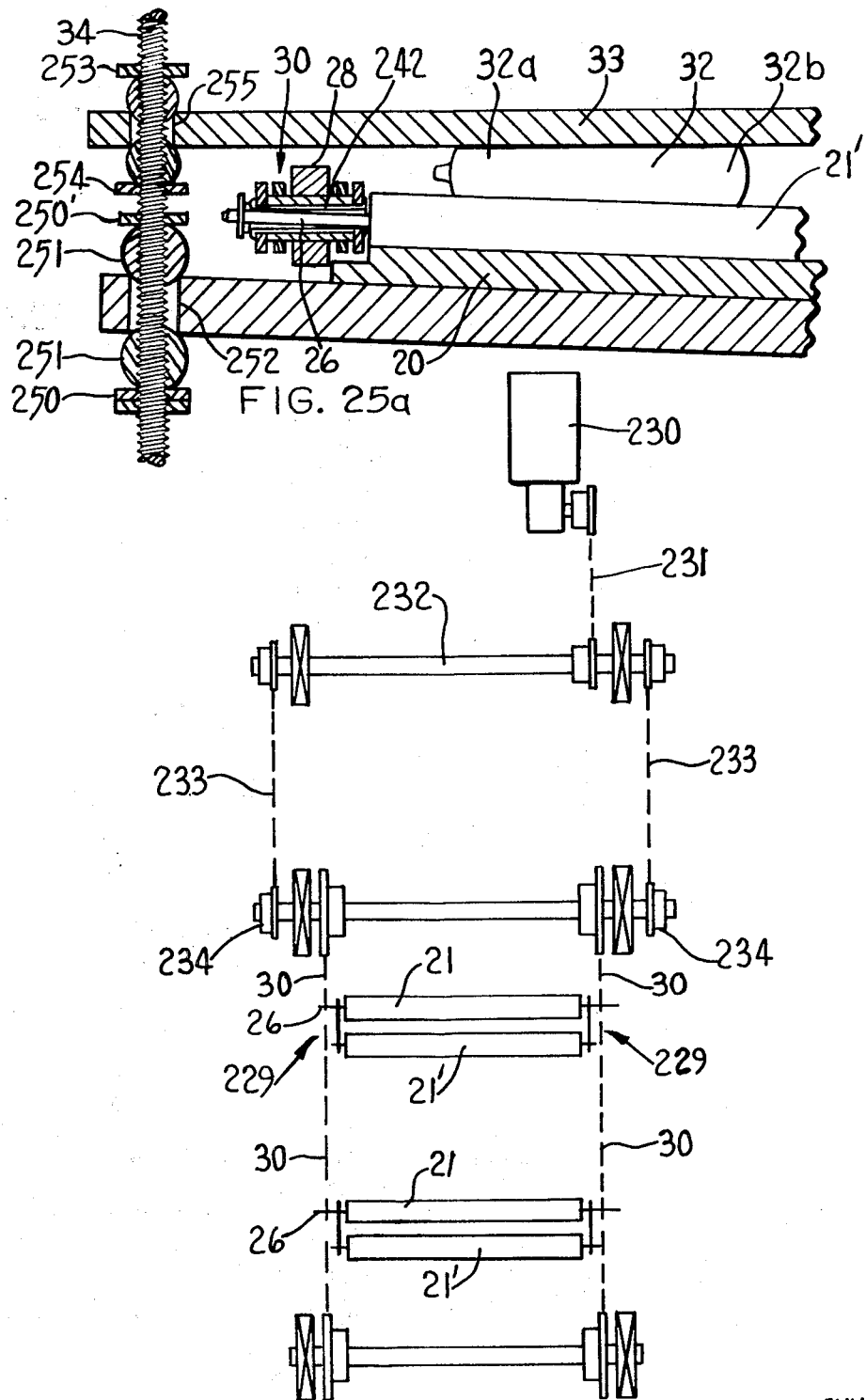
FIG. 25a shows a partial side elevational view, partial in cross section, of a tilted bottom surface and loose roller bearing to accommodate work which is larger at one end than the other.
FIG. 26 illustrates a schematic plan view of a chain driven conveyor system wherein the trailing roller of the roller pairs is tandem-mounted in adjustable floating relation to the leading roller.

Another important feature of the present invention is that the shafts of rollers 21–21', although restricted in the horizontal direction in their bearings, are desirably free to move vertically, as is shown in FIGS. 24–25 and 25a. This enables the entire roller 21 or 21' to adjust to the differences in dimensions and rigidity of the object stamped, rather than half of the roller, as in FIG. 29. Tests performed on a machine in which shafts 26–26' of rollers 21–21' were mounted in conventional bearings exhibited such poor and erratic performance that, from a commercial point of view, it can be stated that the machine was inoperative. When pressure is applied on the rolls by upper plate 33, it is necessary, for satisfactory operation of the machine, that the ends of shafts 26–26' have freedom to move vertically, but not horizontally.

In FIGS. 24–25, which depict a modification of the rotary unit of FIG. 11, chain 30 is provided with vertically elongated bearings 242 in which rotate shafts 26 of rollers 21. In the event uneven objects are to be stamped, the vertical movement of the rollers allows adjustment for irregularities. This is made more apparent in FIG. 25a in which the object stamped is a container 32 having a narrower upper portion 32a than the larger bottom portion 32b. It will be noted that, although chain 30 is in alignment with upper pressure surface 33, shaft 26 of roller 21' is tilted vertically in vertically loose bearing 242 of chain 30. Another important feature shown here is the provision for tilting forwardly or rearwardly the pressure surface 33, or bottom surface 20 to further allow for irregularities in shape or rigidity in objects 32, so as to reduce the crushing effect on rollers 21' (as is apparent from FIG. 29). In FIG. 25a, bottom plate 20 is tilted by moving nuts 250 and 250' on threaded mounting rod 34. Spherical washers 251 hold surface 20 in place by riding in slot 252. The same tilting effect may be obtained in the case of upper surface 33, by similar manipulation of nuts 253–254 on threaded mounting rod 34, with respect to slot 255. In the event the upper surface 33 is tilted, it is then apparent that the die 50–51 also would be desirably tilted.

Figure 27:
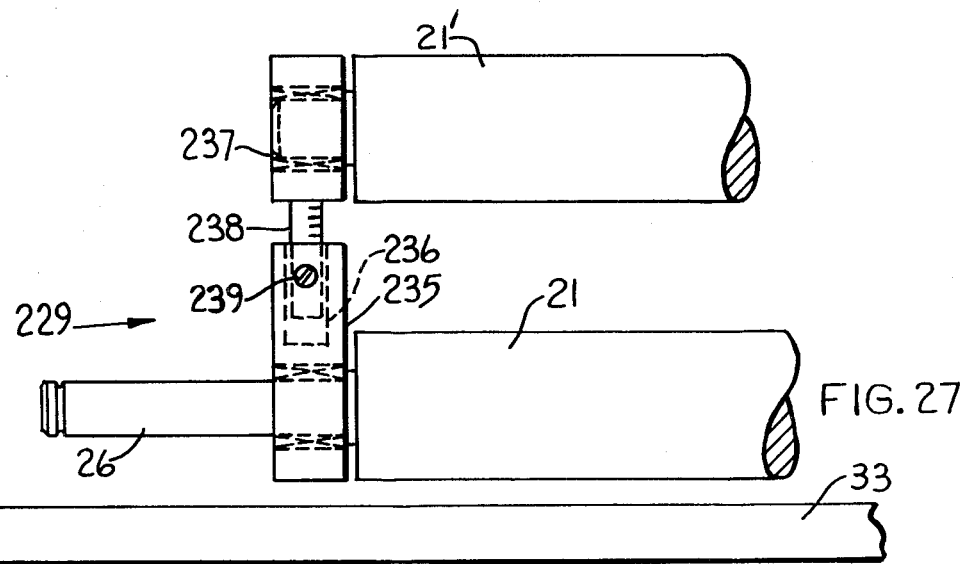
FIG. 27 shows details of the roller ends depicted in FIG. 26.

FIG. 26 depicts a design of a drive for the rollers wherein the trailing roller 21' is attached in tandem floating relation to leading roller 21 by adjustable links, indicated generally by numeral 229. Motor drive 230 drives chain 231 which, in turn drives main shaft 232. This is connected by a chain drive 233, via sprockets 234 which latter drive the roller assembly. The details of the floating roller assembly are shown in FIG. 27. It will be noted that leading roller 21 is connected to trailing roller 21' by an adjustable link 229. Link 229 is broken into portion 235 having recess 236, and portion 237, having dowel 238. The distance between rollers 21 and 21' may be varied by sliding dowel 238 for the required distance into recess 236, and locking dowel 238 into the recess by screw 239. By this means, it is possible to use the same rollers to accommodate containers 32 of a variety of sizes. Shaft 26 is attached to the main conveyor chain 30.

Figure 28:
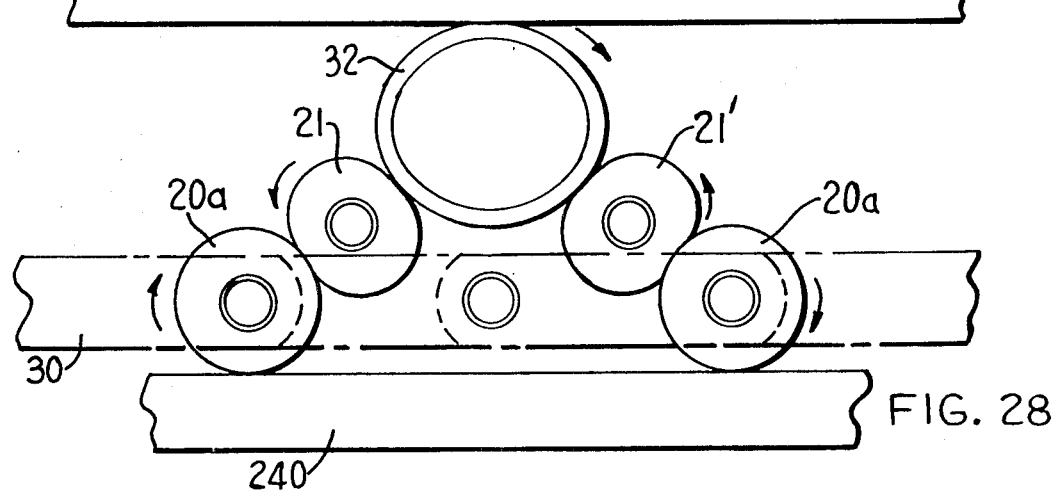
FIG. 28 depicts a schematic front view showing steel rollers serving as the lower rigid gripping surface on which the resilient rollers rotate.

Although the rigid bottom surface 20 has been indicated as a flat plate, it is possible, in a number of cases, to employ rigid rollers for this purpose, as shown in FIGS. 11 and 28. In the latter figure, steel rollers 20a are attached to conveyor chain 30, and they ride on surface or rails 240. Rubber or plastic rollers 21–21', grippable by metal rollers 20a have disposed between them the work or container 32, on top of which pressure is applied by upper pressure plate 33. In such case, rigid rollers 20a substitute for lower plate 20 in the stamping operation.

Figure 29:
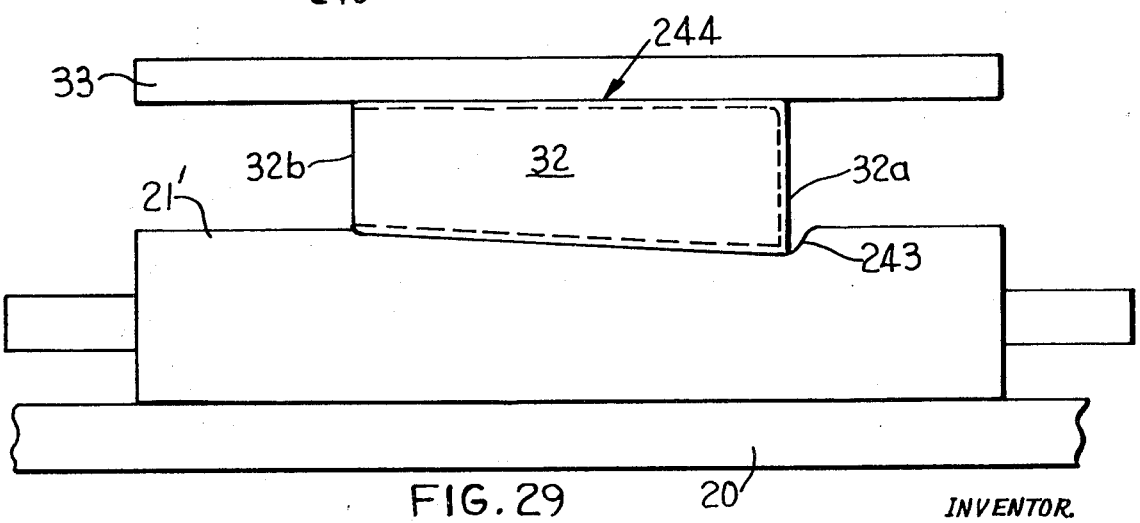
FIG. 29 shows a schematic side elevational view of the action of a container upon the resilient rolls when vertical "ironing" pressure is applied thereon by the upper plate.
Figures 30, 31:
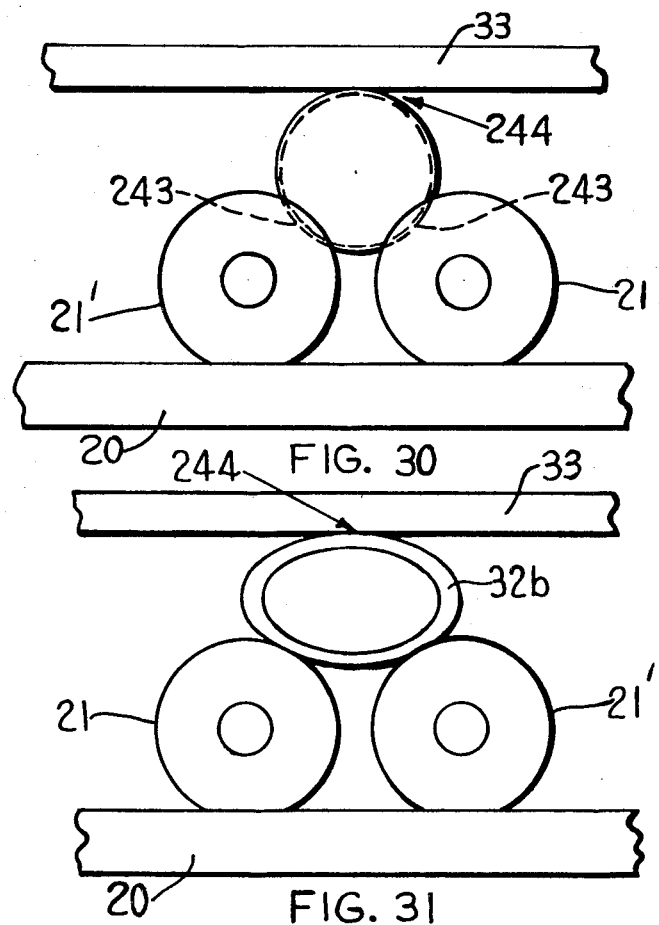
FIGS. 30 and 31 illustrate similar rear and front elevational views of the arrangement depicted in FIG. 29.

FIGS. 29–31 emphasize the importance of impressing a vertically directed plate pressure upon a substantial portion of the contactable area on the top of the article while it is being rolled and stamped. If we take, for example, a conventional container 32 having a closed end 32a and an open end 32b, which is rolled between rollers 21–21' for imprinting by a die in or reciprocating through pressure plate 33, then, due to the "ironing" of the container surface under the high pressure required for hot stamping, the vertical pressure impressed by plate 33 on container 32 caused a distortion of open end 32b, as is shown in FIG. 31, while the closed end 32a, due to the reinforcement effect of the closure, causes a deep depression 243 in the resilient rollers 21–21' (FIG. 30). It is thus apparent that pressure plate 33 must impress a vertical pressure on at least a substantial portion of the contractable area 244 of the top of the container 32 while the container is being rolled to effect the desired hot stamping. This portion of the contactable area 244 should be at least 50 percent, and preferably at least 75 percent. In most cases it would be at least 90 percent to 100 percent.

Figure 32:
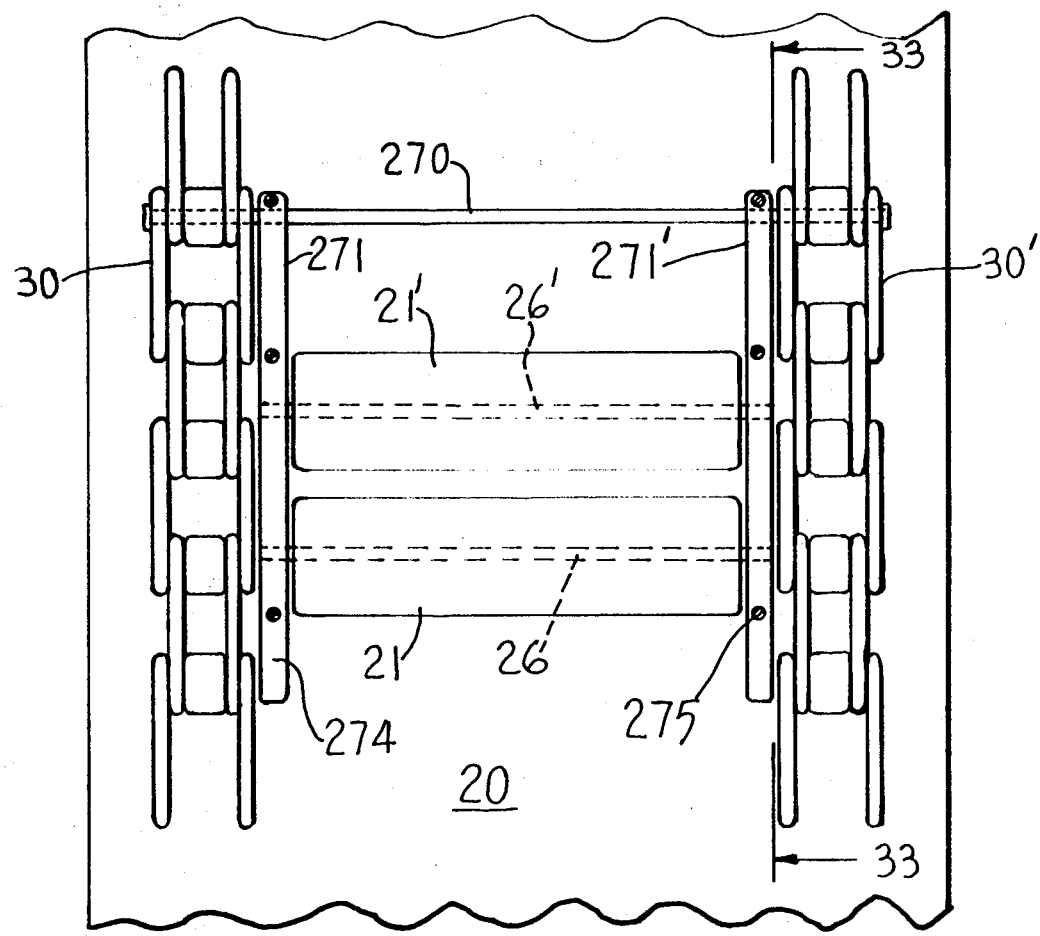
FIG. 32 presents a top view of the conveyor system of the present invention wherein the resilient rollers are mounted in tandem relation on bearing bars which swivel on a cross-shaft connected to the conveyor chains.
Figure 33:
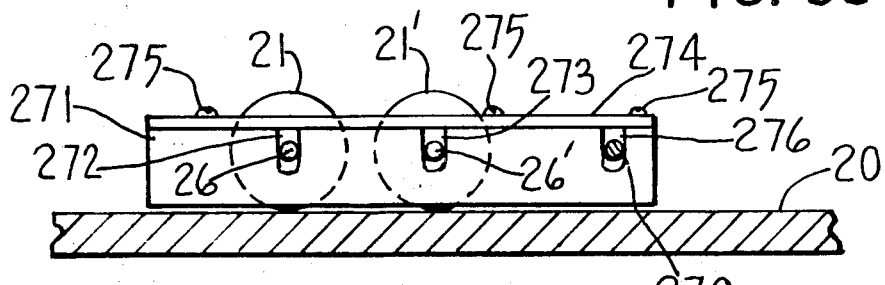
FIG. 33 depicts a side elevational view taken along the plane of line 33 in FIG. 32, showing the vertically slotted bearing arrangement for the rollers and shaft.

FIGS. 32 and 33 describe a desired method of mounting resilient rollers 21–21' onto endless conveyor chains 30–30', as the assembly moves over bottom plate 20. Cross-shaft 270 is connected at both ends to conveyor chains 30–30'. Bearing bars 271–271' are swivelly attached at one end to cross-shaft 270, and are disposed in a manner such that bar 271 is adjacent the inner portion of conveyor chain 30, while bar 271' is adjacent the inner portion of chain 30'. Roller shafts 26 and 26' ride in vertically slotted bearings 272 and 273, respectively. It is also desirable that shaft 270 be disposed in slotted bearings 276. A cover plate 274 is disposed over bearings 272, 273, 276 to prevent shafts 26–26' and 276 from being dislodged, and it is fastened to bars 271–271' by screws 275. It will become apparent that roller shafts 26–26' ride only in slotted bearings 262–262' and they do not extend to chains 30–30'. Accordingly, bearing bars 271–271' swivel only on shaft 270 which is connected at its ends to chains 30–30'. Articles 32 to be imprinted are disposed between rollers 21–21' and under pressure plate 33, the latter not being shown in FIGS. 32–33.

I claim:

1. A press for hot stamping or heat-transferring an image upon a rollable object, comprising:
    a rigid bottom surface,
    at least one pair of similar resilient spaced rollers carrying end-projecting shafts and designed to roll over said bottom surface in gripping relation, and between which a rollable object may be grippingly rolled for hot stamping or heat-transferring thereon,
    a movable chain disposed at each side of said rolls and having vertically slotted bearings for accommodating said projecting end shafts in a manner such as to permit said shaft ends to move vertically but not horizontally,
    a rigid unheated upper surface disposed over said rollers in spaced relation in a manner such as to be capable of applying a vertical downward pressure upon an object being rolled between said rollers,
    a heated die disposed within said upper surface, and
    a foil carrying thermoplastic ink or transfer disposed between said object and said die for transferring the image onto said object as it is rolled under said die.

2. A press, according to claim 1, in which said pair of rollers comprises:
    a first roller having shaft ends riding in said chain bearings,
    a second roller arranged to trail freely behind said first roller, and
    independent-bearing connecting means disposed on each side of both latter rollers and connecting the two rollers.

3. A press, according to claim 2, in which said second roller is adjustably connected to said connecting means to enable increasing or decreasing the distance between the two rollers.

4. A press, according to claim 1, having:
    a cross-shaft disposed between said chains and connected at each end thereto,
    a pair of bearing bars swivelly attached, each at one end to said cross-shaft, in line with said chains and disposed, one apiece near the inner portion of each chain, and
    said pair of rollers being mounted in tandem to and between said bearing bars near the other end thereof.